(12) United States Patent
Schmidt et al.

(10) Patent No.: US 10,425,834 B2
(45) Date of Patent: *Sep. 24, 2019

(54) TECHNIQUES TO SUPPORT DIRECTIONAL TRANSMISSION AND RECEPTION BY WIRELESS NETWORK BOOSTERS

(71) Applicant: Intel IP Corporation, Santa Clara, CA (US)

(72) Inventors: Andreas Schmidt, Braunschweig (DE); Maik Bienas, Schoppenstedt (DE); Martin Hans, Braunschweig (DE); Michael Faerber, Wolfratshausen (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/627,299

(22) Filed: Jun. 19, 2017

(65) Prior Publication Data
US 2018/0098228 A1    Apr. 5, 2018

Related U.S. Application Data

(63) Continuation of application No. 14/293,858, filed on Jun. 2, 2014, now Pat. No. 9,686,694.

(51) Int. Cl.
*H04W 16/26* (2009.01)
*H04W 16/28* (2009.01)
*H04W 76/10* (2018.01)

(52) U.S. Cl.
CPC .......... *H04W 16/26* (2013.01); *H04W 16/28* (2013.01); *H04W 76/10* (2018.02)

(58) Field of Classification Search
None
See application file for complete search history.

(56) References Cited

U.S. PATENT DOCUMENTS

2009/0232063 A1* 9/2009 Cordeiro .................. H01Q 3/26
370/329
2011/0316744 A1* 12/2011 Morioka ............. H04W 72/046
342/367

* cited by examiner

*Primary Examiner* — Peter Chen
*Assistant Examiner* — Jeff Banthrongsack

(57) ABSTRACT

Techniques to support directional transmission and reception by wireless network boosters are described. In one embodiment, for example, an apparatus may comprise logic, at least a portion of which is in hardware, the logic to receive a directionally-transmitted booster reference signal, receive a system information message comprising timing offset information, and determine a time at which to send a link establishment message based on the timing offset information and a time of receipt of the directionally-transmitted booster reference signal. Other embodiments are described and claimed.

16 Claims, 14 Drawing Sheets

| Step | 1 | 2 | 3 | 4 | 5 | 6 | 7 | 8 |
|---|---|---|---|---|---|---|---|---|
| Segment Served | A | B | C | D | E | F | G | H |

| Step | 1 | 2 | 3 | 4 | 5 | 6 | 7 | 8 |
|---|---|---|---|---|---|---|---|---|
| Segment Served | A | C | F | H | E | G | B | D |

| Step | 1 | 2 | 3 | 4 | 5 | 6 | 7 | 8 | 9 | 10 |
|---|---|---|---|---|---|---|---|---|---|---|
| Segment Served | A | C | F | A | H | E | G | A | B | D |

US 10,425,834 B2

TECHNIQUES TO SUPPORT DIRECTIONAL TRANSMISSION AND RECEPTION BY WIRELESS NETWORK BOOSTERS

CROSS-REFERENCE TO RELATED APPLICATIONS

This application is a continuation of, claims the benefit of and priority to previously filed U.S. patent application Ser. No. 14/293,858 filed Jun. 2, 2014, entitled "TECHNIQUES TO SUPPORT DIRECTIONAL TRANSMISSION AND RECEPTION BY WIRELESS NETWORK BOOSTERS", the subject matter of which is incorporated herein by reference in its entirety.

TECHNICAL FIELD

Embodiments herein generally relate to wireless communications between devices in wireless networks.

BACKGROUND

One approach to providing increased capacity in wireless network hotspots and/or filling wireless network coverage holes is the deployment of boosters. Due to the beneficial spatial re-use properties of millimeter wave (mmWave) frequencies, deployed boosters may use mmWave frequency channels to communicate with mobile devices within their coverage areas. In order to achieve greater reach using a given power budget, deployed boosters may utilize directional transmission and reception techniques to communicate with mobile devices. According to the directional transmission and reception techniques, boosters may use beamforming to control their directional transmission and reception orientations.

While the directional transmission and reception techniques may provide a given booster with greater reach, a tradeoff may be that at any point in time, they may provide coverage to only part of that booster's coverage area. In order to provide coverage to its entire coverage area over time, a booster may continually modify its directional transmission and reception orientations. From the perspective of a given mobile device in a booster's coverage area, this may mean that messages can be successfully sent to the booster only at certain times—namely, times at which the booster's directional reception orientation is approximately in the direction of the mobile device.

BRIEF DESCRIPTION OF THE DRAWINGS

FIG. 10 illustrates an embodiment of a first orientation schedule.

FIG. 11 illustrates an embodiment of a second orientation schedule.

FIG. 12 illustrates an embodiment of a third orientation schedule.

DETAILED DESCRIPTION

Various embodiments may be generally directed to techniques to support directional transmission and reception by wireless network boosters. In one embodiment, for example, an apparatus may comprise logic, at least a portion of which is in hardware, the logic to receive a directionally-transmitted booster reference signal, receive a system information message comprising timing offset information, and determine a time at which to send a link establishment message based on the timing offset information and a time of receipt of the directionally-transmitted booster reference signal. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
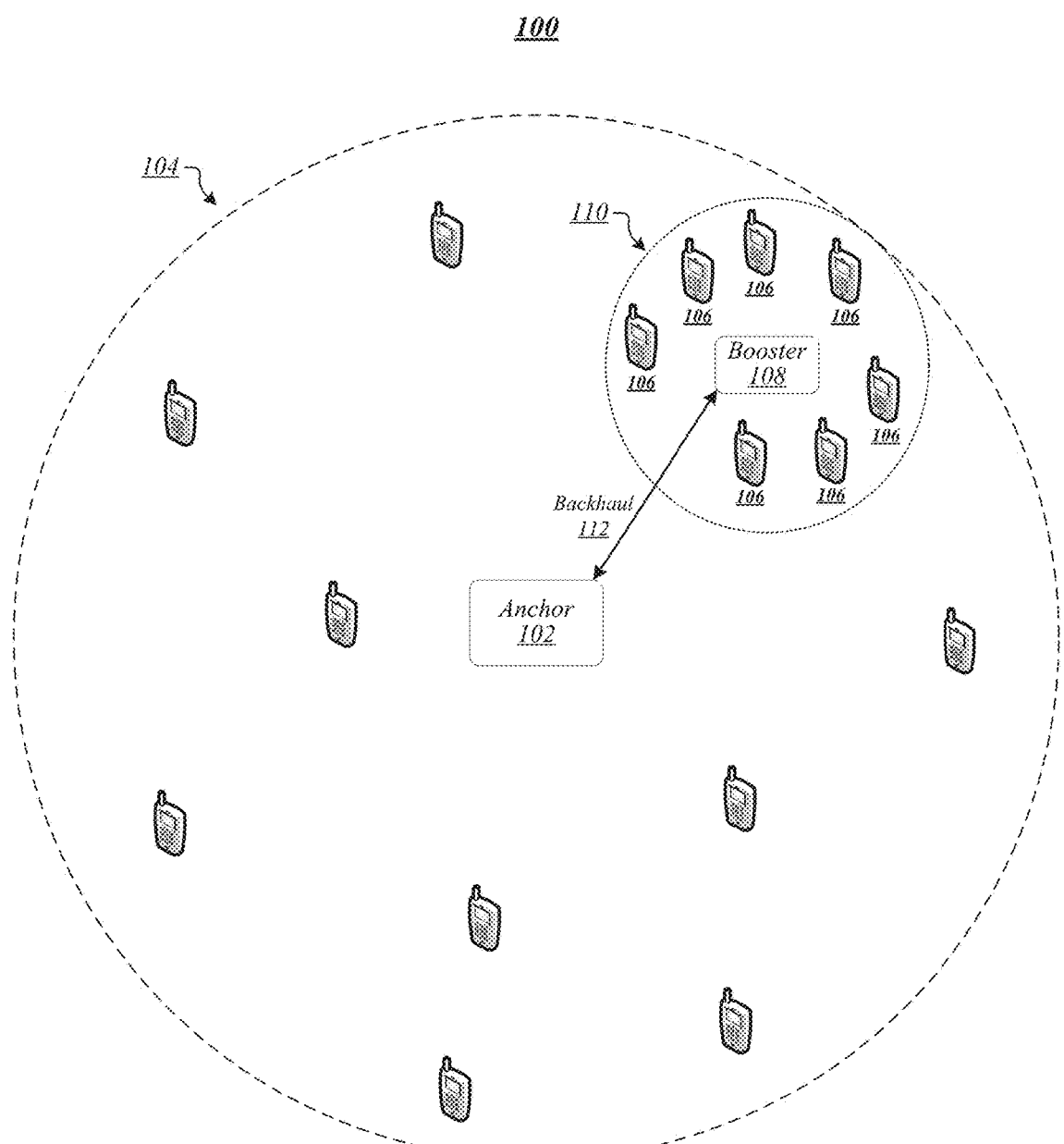
FIG. 1 illustrates an embodiment of an operating environment.

FIG. 1 illustrates an example of an operating environment 100 such as may be representative of various embodiments. In operating environment 100, an anchor 102 generally provides wireless service to a coverage area 104. In some embodiments, anchor 102 may comprise a fixed device in a cellular wireless communications network, and coverage area 104 may comprise a macrocell in that cellular wireless communications network. For example, in various embodiments, anchor 102 may comprise an evolved Node B (eNB) that generally provides wireless service to coverage area 104, and coverage area 104 may comprise a macrocell of a Long Term Evolution (LTE) or LTE Advanced network. The embodiments are not limited to this example.

As shown in FIG. 1, mobile devices may reside at various locations within coverage area 104. In some embodiments, coverage area 104 may comprise a macrocell of an LTE or LTE Advanced network, and the mobile devices may comprise user equipment (UEs). In various embodiments, a disproportionally large fraction of the mobile devices within coverage area 104 may tend to be located within one or more particular regions or "hotspots" within coverage area 104. In the example of FIG. 1, a plurality of mobile devices 106 are clustered in close proximity to each other within a small region in the upper-right portion of coverage area 104. In order to improve capacity and/or coverage within this region, a booster 108 is deployed that provides supplemental wireless service to a coverage area 110. In some embodiments, coverage area 110 may comprise a microcell, picocell, femtocell, or other smaller-sized cell of a cellular wireless communications network in which coverage area 104 comprises a macrocell. In various embodiments in which anchor 102 comprises an eNB that generally provides service to coverage area 104, booster 108 may comprise a booster eNB that provides supplemental service to coverage area 110. The embodiments are not limited in this context.

In some embodiments, booster 108 may communicate with anchor 102 via a backhaul connection 112. In various embodiments, backhaul connection 112 may comprise a wireless backhaul. In some such embodiments, backhaul connection 112 may utilize one or more mmWave frequency channels. In various embodiments, backhaul connection 112 may comprise a direct point-to-point connection between anchor 102 and booster 108. In some other embodiments, backhaul connection 112 may comprise a multi-hop connection, such that anchor 102 connects to booster 108 via one or more intermediate relay nodes. In various embodiments, in addition to operating as a booster, booster 108 may operate as a relay node of a multi-hop connection between anchor 102 and another booster. The embodiments are not limited in this context.

Due to the beneficial spatial re-use properties of mmWave frequencies, it may be desirable to use such frequencies to carry transmissions to and/or from densely deployed mobile devices such as the clustered mobile devices 106 in operating system 100. As such, in some embodiments, booster 108 may communicate with one or more of mobile devices 106 using one or more mmWave channels. In various embodiments, in order to reduce the power consumption associated with using mmWave channels to serve coverage area 110, booster 108 may utilize directional transmission and/or reception techniques. In some embodiments, for a given power budget, the use of such techniques may enable booster 108 to provide coverage to a larger area and reach mobile devices at a greater distance than would be possible using omni-directional transmission and/or reception. It is worthy of note that booster 108 may be operative to directly communicate with mobile device 106 in various embodiments, while in some other embodiments, booster 108 may be operative to communicate with one or more mobile devices 106 via a remote radio head, to which it may connect via a fronthaul link. The embodiments are not limited in this context.

Figure 2:
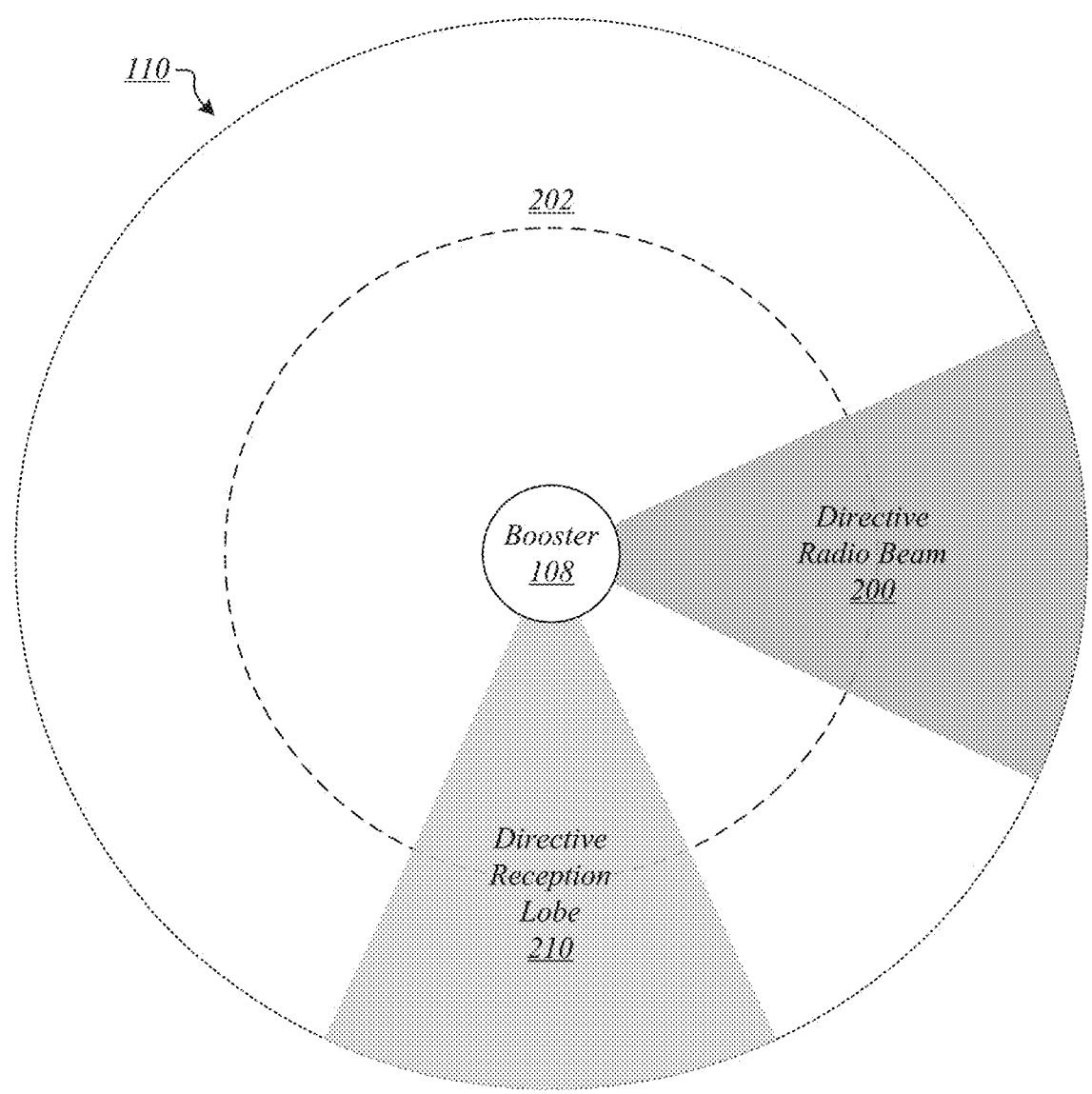
FIG. 2 illustrates an embodiment of a directive radio beam and an embodiment of a directive reception lobe.

FIG. 2 illustrates an example of a directive radio beam 200 such as may be transmitted by booster 108 of FIG. 1 in various embodiments. In FIG. 2, a dashed line 202 depicts an area to which booster 108 may, given a particular power budget, be able to provide coverage using omni-directional transmission. As is evident in FIG. 2, booster 108 cannot transmit far enough omni-directionally to reach the outer portions of coverage area 110 while staying within its power budget. However, using directional transmission techniques such as beamforming, and given the same power budget, booster 108 may be able to form a directive radio beam 200 that does reach the outer portions of coverage area 110. A tradeoff of this approach is that booster 108 may provide coverage only to portions of coverage area that are located in approximately the same direction towards which directive radio beam 200 is oriented. In order to account for this effect, booster 108 may be operative to continually modify the orientation of directive radio beam 200, such that over time, directive radio beam 200 reaches all portions of coverage area 110. The embodiments are not limited in this context.

In some embodiments, booster 108 may comprise a transmission antenna array, and may apply beamforming techniques to the transmission antenna array in order to form directive radio beam 200. In various embodiments, directive radio beam 200 may comprise a main transmission lobe that is formed via the application of beamforming techniques to the transmission antenna array. In some embodiments, booster 108 may also comprise a reception antenna array. In various embodiments, just as booster 108 may not be able to reliably reach mobile devices in the outer portions of its coverage area 110 using omni-directional transmission, booster 108 may not be able to reliably receive messages from mobile devices in the outer portions of its coverage area 110 using omni-directional reception. In some embodiments, booster 108 may be operative to apply beamforming techniques to the reception antenna array in order to form directive reception lobe 210. Directive reception lobe 210 may comprise a main reception lobe that is formed via the application of beamforming techniques to the reception antenna array. In various embodiments, just as it continually modifies the orientation of directive radio beam 200 in order to generally enable transmission to all regions of coverage area 110, booster 108 may be operative to continually modify the orientation of directive reception lobe 210 in order to generally enable reception of transmissions from all regions of coverage area 110. The embodiments are not limited in this context.

In some embodiments, booster 108 may be operative to continually modify the orientations of directive radio beam 200 and directive reception lobe 210 according to a directional transmission and reception pattern. In various embodiments, the directional transmission and reception pattern may define a transmission orientation pattern and a reception orientation pattern. In some embodiments, the reception orientation pattern may comprise the same changes in orientation as the transmission orientation pattern, delayed by a fixed time offset. The embodiments are not limited in this context.

In various embodiments, the directional transmission and reception pattern may specify a pattern of continuous movement. For example, according to the directional transmission and reception pattern in some embodiments, directive radio beam 200 and/or directive reception lobe 210 may continuously rotate counterclockwise about booster 108. In various other embodiments, the directional transmission and reception pattern may specify a pattern of discrete movements. For example, according to the directional transmission and reception pattern in some embodiments, directive radio beam 200 and/or directive reception lobe 210 may periodically jump to new orientations. In various embodiments, the directional transmission and reception pattern may subdivide coverage area 110 into multiple segments, and directive radio beam 200 and/or directive reception lobe 210 may periodically jump from one segment to another. In some embodiments, each jump may be to an adjacent segment in a same direction about booster 108. For example, in various embodiments, each jump may be a movement to a next segment in a counterclockwise direction about booster 108. In some other embodiments, some jumps may be in different directions about booster 108, and/or may comprise jumps to non-adjacent segments. In various embodiments, there may be overlap between the sub-regions covered prior to a particular jump and the sub-regions covered following that jump. In some embodiments, the directional transmission and reception pattern may specify a combination of continuous movements and discrete movements. It is worthy of note that in some embodiments, the directive radio beam 200 and/or directive reception lobe 210 may continuously rotate or jump clockwise about booster 108, counterclockwise about booster 108, or a combination of both. The embodiments are not limited in this context.

In various embodiments, the directional transmission and reception pattern may provide coverage equally in all directions about booster 108. For example, in some embodiments in which the directional transmission and reception pattern sub-divides coverage area 110 into multiple segments, directive radio beam 200 and/or directive reception lobe 210 may provide coverage to the segments in equal proportion. In various other embodiments, the directional transmission and reception pattern may provide more coverage in some directions than it does in others. For example, in some embodiments in which the directional transmission and reception pattern sub-divides coverage area 110 into multiple segments, directive radio beam 200 and/or directive reception lobe 210 may jump to certain segments more frequently than other segments. The embodiments are not limited in this context.

Returning to FIG. 1, in order to enable mobile devices that enter coverage area 110 to detect booster 108, booster 108 may transmit reference signals such as beacons, synchronization signals, and/or reference symbols. In order that they reach the periphery of coverage area 110, booster 108 may transmit such reference signals directionally, using a directive radio beam such as that depicted in FIG. 2. Mobile devices that receive such reference signals and wish to obtain service from booster 108 may transmit responses to booster 108. As noted above, just as booster 108 may use a directive radio beam to enable its transmissions to reach the outer portions of coverage area 110, booster 108 may implement directional reception in order that it may receive transmissions from mobile devices in the outer portions of coverage area 110. As such, at any given point in time, booster 108 may be "listening" in a particular direction. If a mobile device that is located in an opposite direction transmits a response to booster 108 at that point in time, booster 108 may not properly receive that response. To address this issue, it may be desirable to implement a scheme for notifying mobile devices of appropriate transmission times for messages that they send in response to received reference signals. In other words, it may be desirable to introduce a scheme for signaling to mobile devices 106 uplink transmission opportunities for responding to received beacons or other reference signals.

Disclosed herein are techniques to support directional transmission and reception by wireless network boosters, such as booster 108. According to such techniques, in various embodiments, the mobile devices in a coverage area of a booster may be provided with timing offset information for use in determining times at which they send responses to reference signals received from the booster. In some embodiments, the timing offset information may be defined by a directional transmission and reception pattern. In various embodiments the timing offset information may indicate, with respect to a transmission orientation of a booster at any arbitrary point in time, an amount of time after which a reception orientation of the booster will be the same as was the transmission orientation at the arbitrary point in time. The embodiments are not limited in this context.

Figure 3:
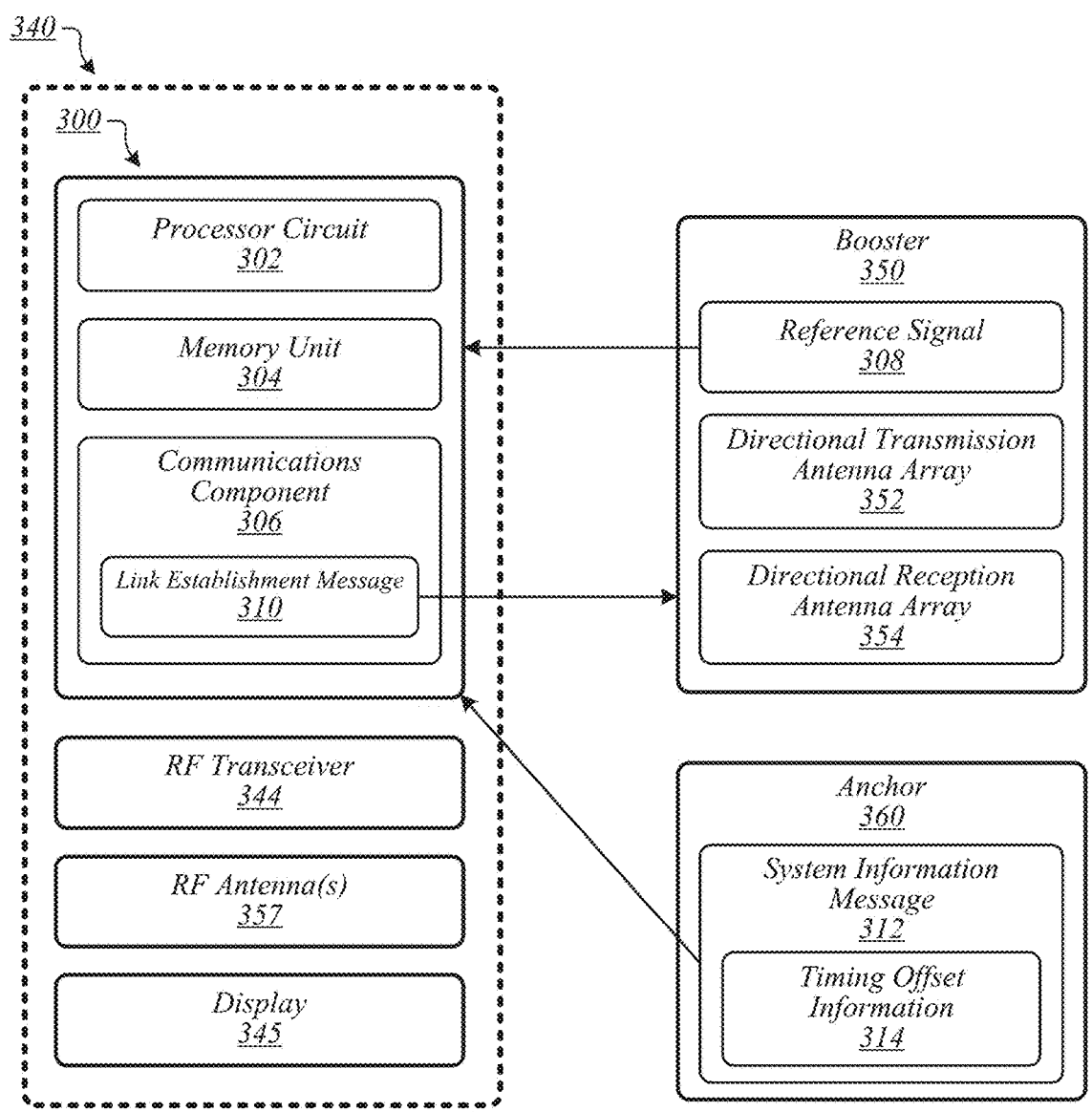
FIG. 3 illustrates an embodiment of a first apparatus and an embodiment of a first system.

FIG. 3 illustrates a block diagram of an apparatus 300. Apparatus 300 may be representative of a mobile device that implements techniques to support directional transmission and reception by wireless network boosters. As shown in FIG. 3, apparatus 300 comprises multiple elements including a processor circuit 302, a memory unit 304, and a communications component 306. The embodiments, however, are not limited to the type, number, or arrangement of elements shown in this figure.

In some embodiments, apparatus 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 302 may be implemented as a general purpose processor, such as a processor made by Intel® Corporation, Santa Clara, Calif. The embodiments are not limited in this context.

In various embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in some embodiments. The embodiments are not limited in this context.

In various embodiments, apparatus 300 may comprise a communications component 306. Communications component 306 may comprise logic, circuitry, and/or instructions operative to send messages to one or more remote devices and/or to receive messages from one or more remote devices. In some embodiments, communications component 306 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

FIG. 3 also illustrates a block diagram of a system 340. System 340 may comprise any of the aforementioned elements of apparatus 300. System 340 may further comprise a radio frequency (RF) transceiver 344. RF transceiver 344 may comprise one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 344 may operate in accordance with one or more applicable standards in any version. In various embodiments, RF transceiver 344 may be operative to transmit and/or receive signals over one or more mmWave frequency channels. The embodiments are not limited in this context.

In some embodiments, system 340 may comprise one or more RF antennas 357. Examples of any particular RF antenna 357 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, RF transceiver 344 may be operative to send and/or receive messages and/or data using one or more RF antennas 357. The embodiments are not limited to these examples.

In some embodiments, system 340 may comprise a display 345. Display 345 may comprise any display device capable of displaying information received from processor circuit 302. Examples for display 345 may include a television, a monitor, a projector, and a computer screen. In one embodiment, for example, display 345 may be implemented by a liquid crystal display (LCD), light emitting diode (LED) or other type of suitable visual interface. Display 345 may comprise, for example, a touch-sensitive display screen ("touchscreen"). In various implementations, display 345 may comprise one or more thin-film transistors (TFT) LCD including embedded transistors. The embodiments, however, are not limited to these examples.

In some embodiments, during operation, apparatus 300 and/or system 340 may enter a coverage area of a booster 350. For example, with reference to FIG. 1, apparatus 300 and/or system 340 may comprise a mobile device 106 that enters the coverage area 110 of booster 108. In various embodiments, apparatus 300 and/or system 340 may comprise a UE and booster 350 may comprise a booster eNB. In some embodiments, booster 350 may comprise a directional transmission antenna array 352. Directional transmission antenna array 352 may comprise one or more antennas arranged to perform directional transmission of one or more messages. In various embodiments, booster 350 may be operative to perform beamforming operations in order to implement directional transmission antenna array 352. In some embodiments, directional transmission antenna array 352 may be configured to perform directional transmissions over one or more mmWave frequency channels. The embodiments are not limited in this context.

In various embodiments, booster 350 may comprise a directional reception antenna array 354. Directional reception antenna array 354 may comprise one or more antennas arranged to perform directional reception of one or more messages. In some embodiments, booster 350 may be operative to perform beamforming operations in order to implement directional reception antenna array 354. In various embodiments, directional reception antenna array 354 may be configured to directionally receive messages over one or more mmWave frequency channels. In some embodiments, directional transmission antenna array 352 and directional reception antenna array 354 may comprise physically distinct antenna arrays. In various other embodiments, a same physical antenna array may be arranged to operate as directional transmission antenna array 352 at some times and to operate as directional reception antenna array 354 at other times. The embodiments are not limited in this context.

In some embodiments, communications component 306 may be operative to receive a reference signal 308 from the booster 350. In various embodiments, reference signal 308 may comprise a directionally-transmitted signal. In some embodiments, booster 350 may be operative to directionally transmit reference signal 308 using directional transmission antenna array 352. In various embodiments, communications component 306 may receive reference signal 308 over an mmWave frequency channel. In some embodiments, reference signal 308 may comprise a signal usable by apparatus 300 and/or system 340 to determine that it has entered the coverage area of booster 350 and/or to identify booster 350. In various embodiments, reference signal 308 may comprise one or more beacons. In some embodiments, reference signal 308 may comprise one or more synchronization signals and/or one or more reference symbols. In various embodiments, reference signal 308 may comprise a coverage sector identifier (ID) that identifies, from among a plurality of coverage sectors within a coverage area of booster 350, a coverage sector towards which directional transmission antenna array 352 was oriented at the time of transmission of reference signal 308. In some embodiments, reference signal 308 may comprise a booster ID that identifies booster 350. The embodiments are not limited in this context.

In various embodiments, it may be desirable for apparatus 300 and/or system 340 to establish a wireless link with booster 350 in order to obtain wireless network service. In some embodiments, in order to initiate a process for establishing a wireless link with booster 350, apparatus 300 and/or system 340 may need to send a link establishment message 310 to booster 350. In various embodiments, link establishment message 310 may comprise a beacon response. In some embodiments, link establishment message 310 may comprise a random access preamble. In various embodiments, in order to enable booster 350 to properly receive link establishment message 310, it may be desirable for apparatus 300 and/or system 340 to transmit link establishment message 310 at a time at which the directional reception antenna array 354 of booster 350 is oriented approximately towards apparatus 300 and/or system 340. In some embodiments, reference signal 308 may not in and of itself constitute information that is sufficient for use by apparatus 300 and/or system 340 to determine a time at which the directional reception antenna array 354 of booster 350 will be oriented approximately towards apparatus 300 and/or system 340. The embodiments are not limited in this context.

In various embodiments, communications component 306 may be operative to receive a system information message 312 comprising timing offset information 314 for use in determining a time at which to send link establishment message 310. In some embodiments, system information message 312 may comprise an enhanced system information broadcast message. In various embodiments, system information message 312 may be received from an anchor 360. In some such embodiments, system information message 312 may comprise an omni-directional transmission of anchor 360. In various embodiments, anchor 360 may provide service to a macrocell, and booster 350 may provide service to a microcell, picocell, femtocell, or other small cell or sub-region within the macrocell served by the anchor 360. In some embodiments, anchor 360 may be operative to select, manage, and/or control a directional transmission and reception pattern implemented by booster 350. In various embodiments, booster 350 may comprise a booster eNB and anchor 360 may comprise an anchor eNB. In some embodiments, communications component 306 may be operative to receive system information message 312 from booster 350 rather than from anchor 360. The embodiments are not limited in this context.

In various embodiments, timing offset information 314 may indicate an amount of time after transmission of reference signal 308 that directional reception antenna array 354 will be oriented in a same or approximately same direction as that in which directional transmission antenna array 352 was oriented upon transmission of reference signal 308. In some embodiments, timing offset information 314 may comprise one or more parameters defined by a directional transmission and reception pattern implemented by booster 350. In various embodiments, anchor 360 may be operative to select, manage, and/or control the directional transmission and reception pattern implemented by booster 350, and may determine timing offset information 314 based on that directional transmission and reception pattern.

In some embodiments, timing offset information 314 may not be specific to reference signal 308 or the time at which reference signal 308 was transmitted, but rather may comprise universally applicable time offset characteristics of an orientation pattern of directional transmission antenna array 352 and an orientation pattern of directional reception antenna array 354. For example, in various embodiments, anchor 360 may be operative to define the directional transmission and reception pattern implemented by booster 350 such that the orientation of directional transmission antenna array 352 at any arbitrary time x is the same as the orientation of directional reception antenna array 354 at the subsequent time x+T, where T is a universal time offset and is reported in the timing offset information 314. The embodiments are not limited to this example.

In some embodiments, timing offset information 314 may simply comprise a universal time offset such as the parameter T discussed in the aforementioned example. In various other embodiments, timing offset information 314 may additionally or alternatively comprise other time offset characteristics. For example, in some embodiments, timing offset information 314 may comprise information identifying a time offset between a dwell time for a transmission orientation pattern of booster 350 and a submission opportunity period for a reception orientation pattern of booster 350. In another example, in various embodiments, timing offset information 314 may include information indicating an uncertainty and/or possible deviation time for a universal time offset such as the aforementioned parameter T. The embodiments are not limited in this context.

In some embodiments, communications component 306 may be operative to determine a time at which to send link establishment message 310 based on timing offset information 314. In various embodiments, communications component 306 may be operative to determine the time at which to send link establishment message 310 based on timing offset information 314 and on a time of receipt of reference signal 308. In some embodiments, communications component 306 may be operative to add a time offset identified by timing offset information 314 to the time of receipt of reference signal 308 in order to determine the time at which to send link establishment message 310. In various embodiments, this approach may reflect an underlying assumption that the difference between the time at which booster 350 sends reference signal 308 and the time at which apparatus 300 and/or system 340 receives reference signal 308 will be negligible and may be discounted. In some embodiments, this assumption may not be made, and communications component 306 may be operative to adjust its determined time to account for the difference between the time at which booster 350 sends reference signal 308 and the time at which apparatus 300 and/or system 340 receives reference signal 308. For example, in some embodiments, if the transmit duration between apparatus 300 and/or system 340 and booster 350 (and vice versa) is not negligible, communications component 306 may be operative to reduce the time offset identified by timing offset information 314, in order to account for the transmit duration of reference signal 308. Communications component 306 may then be operative to add the reduced time offset to the time of receipt of reference signal 308 in order to determine the time at which to send link establishment message 310. The embodiments are not limited in this context.

In various embodiments, communications component 306 may be operative to send link establishment message 310 to booster 350 at the time determined based on timing offset information 314. In some embodiments, communications component 306 may be operative to identify a coverage sector ID comprised in reference signal 308 and to include that coverage sector ID in link establishment message 310. In various embodiments, communications component 306 may be operative to determine a booster ID for booster 350 and to include that booster ID in link establishment message 310. In some embodiments, including the coverage sector ID and/or booster ID in link establishment message 310 may enable booster 350 to determine or estimate a current orientation of apparatus 300 and/or system relative to booster 350, and/or to determine or estimate an optimum directive radio beam and/or directive reception lobe angle for transmitting to and/or receiving from apparatus 300 and/or system 340. The embodiments are not limited in this context. In some embodiments, communications component 306 may be operative to send link establishment message 310 to booster 350 using RF transceiver 344 and/or one or more RF antennas 357. In various embodiments, communications component 306 may be operative on RF transceiver 344 and/or one or more RF antennas 357 to transmit link establishment message 310 over an mmWave frequency channel. In some embodiments, communications component 306 may be operative on RF transceiver 344 and/or one or more RF antennas 357 to transmit link establishment message 310 omni-directionally. In various embodiments, directional reception antenna array 354 may be oriented approximately towards apparatus 300 and/or system 340 at the time at which link establishment message 310 is transmitted, and booster 350 may be operative to receive link establishment message 310 using directional reception antenna array 354. The embodiments are not limited in this context.

Figure 4:
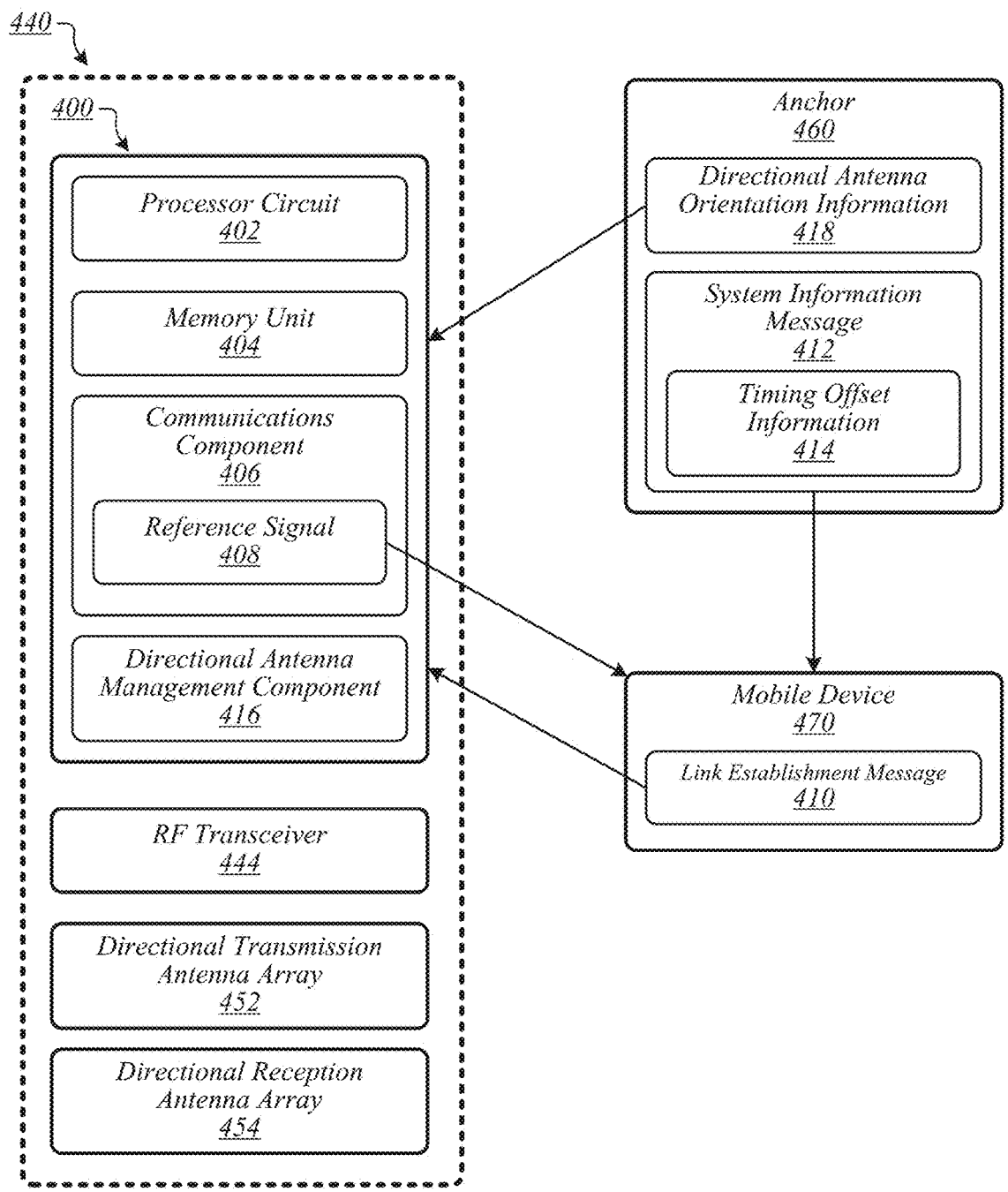
FIG. 4 illustrates an embodiment of a second apparatus and an embodiment of a second system.

FIG. 4 illustrates a block diagram of an apparatus 400. Apparatus 400 may be representative of a fixed device that operates as a booster and performs directional transmission and/or reception. For example, apparatus 400 may be representative of booster 350 of FIG. 3. As shown in FIG. 4, apparatus 400 comprises multiple elements including a processor circuit 402, a memory unit 404, a communications component 406, and a directional antenna management component 416. The embodiments, however, are not limited to the type, number, or arrangement of elements shown in this figure.

In some embodiments, apparatus 400 may comprise processor circuit 402. Processor circuit 402 may be implemented using any processor or logic device, and may be the same as or similar to processor circuit 302 of FIG. 3. The embodiments are not limited in this context.

In various embodiments, apparatus 400 may comprise or be arranged to communicatively couple with a memory unit 404. Memory unit 404 may be implemented using any machine-readable or computer-readable media capable of storing data, including both volatile and non-volatile memory, and may be the same as or similar to memory unit 304 of FIG. 3. The embodiments are not limited in this context.

In some embodiments, apparatus 400 may comprise a communications component 406. Communications component 406 may comprise logic, circuitry, and/or instructions operative to send messages to one or more remote devices and/or to receive messages from one or more remote devices and/or to perform various operations in support of such communications, and may be the same as or similar to communications component 306 of FIG. 3. The embodiments are not limited in this context.

In various embodiments, apparatus 400 may comprise a directional antenna management component 416. Directional antenna management component 416 may comprise logic, circuitry, and/or instructions operative to manage and/or control the orientations of one or more directional antennas and/or antenna arrays. In some embodiments, the one or more directional antennas and/or antenna arrays may include one or more directional transmission antennas and/or antenna arrays, and/or may include one or more directional reception antennas and/or antenna arrays. In various embodiments, directional antenna management component 416 may be operative to control the orientations of one or more directional antennas and/or antenna arrays based on a directional transmission and reception pattern. The embodiments are not limited in this context.

FIG. 4 also illustrates a block diagram of a system 440. System 440 may comprise any of the aforementioned elements of apparatus 400. System 440 may further comprise an RF transceiver 444. RF transceiver 444 may comprise one or more radios capable of transmitting and receiving signals using various suitable wireless communications techniques. Such techniques may involve communications across one or more wireless networks. Exemplary wireless networks include (but are not limited to) WLANs, WPANs, WMANs, cellular networks, and satellite networks. In communicating across such networks, RF transceiver 444 may operate in accordance with one or more applicable standards in any version. In various embodiments, RF transceiver 444 may be operative to transmit and/or receive signals over one or more mmWave frequency channels. The embodiments are not limited in this context.

In some embodiments, system 440 may comprise a directional transmission antenna array 452. Directional transmission antenna array 452 may comprise one or more antennas arranged to perform directional transmission of one or more messages. In various embodiments, directional antenna management component 416 may be operative to perform beamforming operations in order to implement directional transmission antenna array 452. In some embodiments, directional transmission antenna array 452 may be configured to perform directional transmissions over one or more mmWave frequency channels. The embodiments are not limited in this context.

In various embodiments, system 440 may comprise a directional reception antenna array 454. Directional reception antenna array 454 may comprise one or more antennas arranged to perform directional reception of one or more messages. In some embodiments, directional antenna management component 416 may be operative to perform beamforming operations in order to implement directional reception antenna array 454. In various embodiments, directional reception antenna array 454 may be configured to directionally receive messages over one or more mmWave frequency channels. In some embodiments, directional transmission antenna array 452 and directional reception antenna array 454 may comprise physically distinct antenna arrays. In various other embodiments, a same physical antenna array may be arranged to operate as directional transmission antenna array 452 at some times and to operate as directional reception antenna array 454 at other times. The embodiments are not limited in this context.

In some embodiments, directional antenna management component 416 may be operative to manage and/or control the orientations of directional transmission antenna array 452 and/or directional reception antenna array 454. In various embodiments, directional antenna management component 416 may be operative to manage and/or control the orientations of directional transmission antenna array 452 and/or directional reception antenna array 454 based on directional antenna orientation information 418 received from an anchor 460. In some embodiments, the directional antenna orientation information 418 may describe a directional transmission and reception pattern for implementation using directional transmission antenna array 452 and directional reception antenna array 454. In various embodiments, directional antenna management component 416 may be operative to implement that directional transmission and reception pattern based on directional antenna orientation information 418. In some other embodiments, directional antenna management component 408 may be operative to independently select and implement a directional transmission and reception pattern. The embodiments are not limited in this context.

In various embodiments, according to a directional transmission and reception pattern that directional antenna management component 416 implements, there may be a universally applicable time offset between an orientation pattern of directional transmission antenna array 452 and an orientation pattern of directional reception antenna array 454. For example, directional antenna management component 416 may be operative to implement a directional transmission and reception pattern that defines a time offset T, according to which the orientation of directional transmission antenna array 452 at any arbitrary time x may be the same as the orientation of directional reception antenna array 454 at the subsequent time x+T. The embodiments are not limited in this context.

In some embodiments, in order to enable mobile devices that enter a coverage area of apparatus 400 and/or system 440 to detect apparatus 400 and/or system 440, communications component 406 may be operative to send a reference signal 408. In various embodiments, communications component 406 may be operative to directionally transmit reference signal 408 using directional transmission antenna array 452. In some embodiments, communications component 406 may be operative to send reference signal 408 over an mmWave frequency channel. In various embodiments, reference signal 408 may comprise one or more beacons. In some embodiments, reference signal 408 may comprise one or more synchronization signals and/or one or more reference symbols. In various embodiments, a mobile device 470 may receive reference signal 408 and detect apparatus 400 and/or system 440 based on reference signal 408. In some embodiments, apparatus 400 and/or system 440 may comprise a booster eNB and the mobile device 470 may comprise a UE. The embodiments are not limited in this context.

In various embodiments, at the time that communications component 406 generates reference signal 408, directional transmission antenna array 452 may be oriented towards a particular coverage sector within a coverage area of apparatus 400 and/or system 440. In some embodiments, communications component 406 may be operative to determine a coverage sector ID for that coverage sector and to include the coverage sector ID in the reference signal 408. In various embodiments, communications component 406 may be operative to determine a booster ID corresponding to apparatus 400 and/or system 440 and to include the booster ID in the reference signal 408. The embodiments are not limited in this context.

In some embodiments, in response to reference signal 408, mobile device 470 may transmit a link establishment message 410. In various embodiments, link establishment message 410 may comprise a beacon response. In some embodiments, link establishment message 410 may comprise a random access preamble. In various embodiments, link establishment message 410 may comprise a coverage sector ID that was included in reference signal 408. In some embodiments, link establishment message 410 may comprise a booster ID that was included in reference signal 408. The embodiments are not limited in this context.

In various embodiments, mobile device 470 may be operative to transmit link establishment message 410 at a time at which the orientation of directional reception antenna array 454 is the same as was the orientation of directional transmission antenna array 452 when the reference signal 408 was transmitted. In some embodiments, mobile device 470 may determine the time at which it transmits the link establishment message 410 based on timing offset information 414 in a system information message 412 that it receives from the anchor 460. In various embodiments, the system information message 412 may comprise an enhanced system information broadcast message. In some embodiments, mobile device 470 may be operative to receive system information message 412 and/or timing offset information 414 from apparatus 400 and/or system 440 rather than from anchor 460. The embodiments are not limited in this context.

Figure 5:
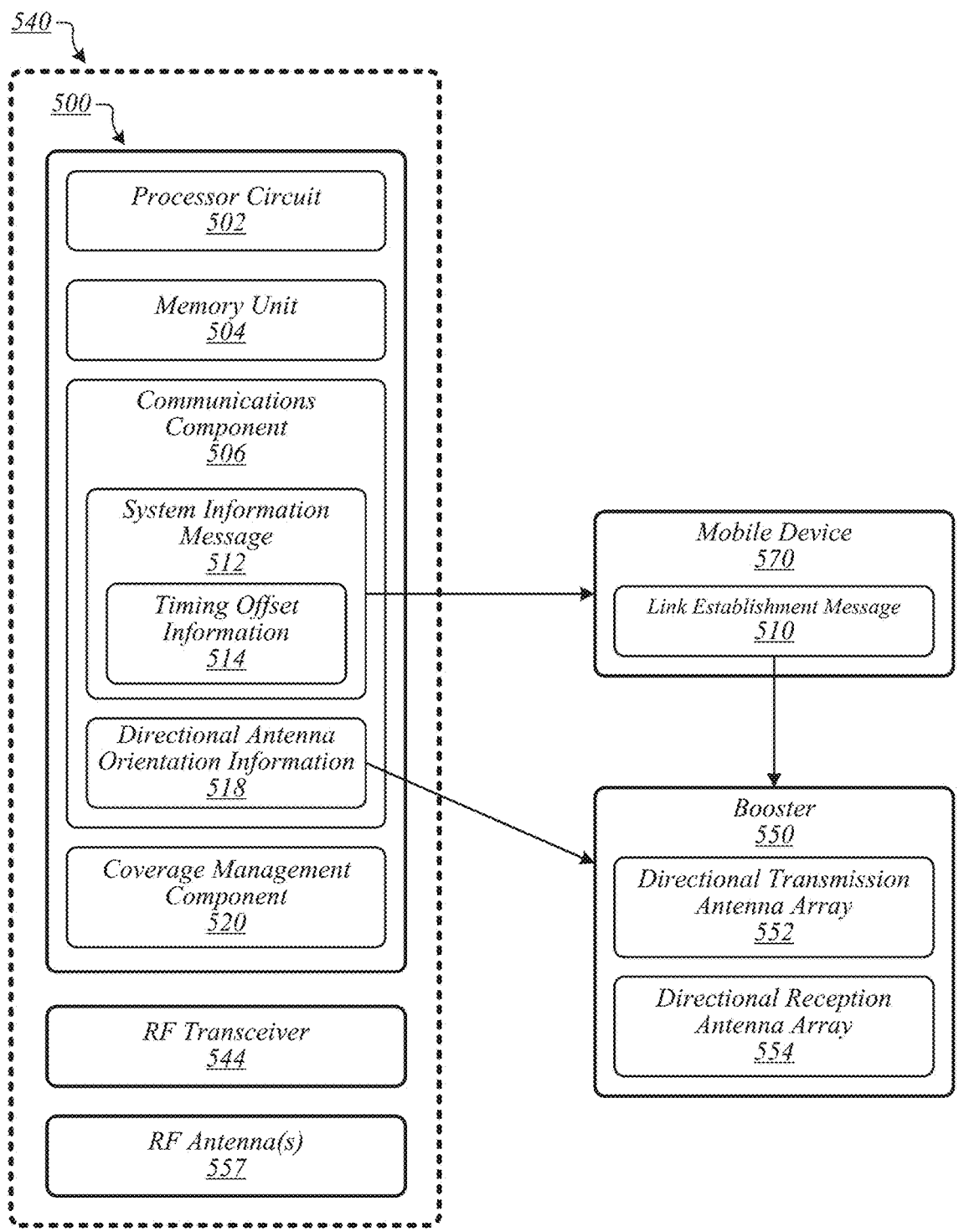
FIG. 5 illustrates an embodiment of a third apparatus and an embodiment of a third system.

FIG. 5 illustrates a block diagram of an apparatus 500. Apparatus 500 may be representative of a fixed device that operates as an anchor, such as anchor 360 of FIG. 3 and/or anchor 460 of FIG. 4. As shown in FIG. 5, apparatus 500 comprises multiple elements including a processor circuit 502, a memory unit 504, a communications component 506, and a coverage management component 520. The embodiments, however, are not limited to the type, number, or arrangement of elements shown in this figure.

In various embodiments, apparatus 500 may comprise processor circuit 502. Processor circuit 502 may be implemented using any processor or logic device, and may be the same as or similar to processor circuit 302 of FIG. 3 and/or processor circuit 402 of FIG. 4. The embodiments are not limited in this context.

In some embodiments, apparatus 500 may comprise or be arranged to communicatively couple with a memory unit 504. Memory unit 504 may be implemented using any machine-readable or computer-readable media capable of storing data, including both volatile and non-volatile memory, and may be the same as or similar to memory unit 304 of FIG. 3 and/or memory unit 404 of FIG. 4. The embodiments are not limited in this context.

In various embodiments, apparatus 500 may comprise a communications component 506. Communications component 506 may comprise logic, circuitry, and/or instructions operative to send messages to one or more remote devices and/or to receive messages from one or more remote devices and/or to perform various operations in support of such communications, and may be the same as or similar to communications component 306 of FIG. 3 and/or communications component 406 of FIG. 4. The embodiments are not limited in this context.

In some embodiments, apparatus 500 may comprise a coverage management component 520. Coverage management component 520 may comprise logic, circuitry, and/or instructions operative to manage the coverage provided by one or more fixed devices in a wireless communications network. In various embodiments, the one or more fixed devices may include one or more boosters. In some embodiments, coverage management component 520 may be operative to manage the coverage provided by one or more fixed devices by selecting directional transmission and reception patterns for those fixed devices. The embodiments are not limited in this context.

FIG. 5 also illustrates a block diagram of a system 540. System 540 may comprise any of the aforementioned elements of apparatus 500. System 540 may further comprise an RF transceiver 544. RF transceiver 544 may comprise one or more radios capable of transmitting and receiving signals using various suitable wireless communications techniques, and may be the same as or similar to RF transceiver 444 of FIG. 4. The embodiments are not limited in this context.

In various embodiments, system 540 may comprise one or more RF antennas 557. Examples of any particular RF antenna 557 may include any of the examples previously mentioned with respect to RF antennas 357 of FIG. 3. In some embodiments, apparatus 500 and/or system 540 may be configured to perform directional transmission and/or reception, and RF antennas 557 may include a directional transmission antenna array that is the same as or similar to directional transmission antenna array 452 of FIG. 4 and/or a directional reception antenna array that is the same as or similar to directional reception antenna array 454 of FIG. 4. The embodiments are not limited in this context.

In various embodiments, during operation of apparatus 500 and/or system 540, coverage management component 520 may be operative to manage the coverage provided by a booster 550. In some embodiments, in order to manage the coverage provided by booster 550, coverage management component 520 may be operative to select a directional transmission and reception pattern for booster 550. In various embodiments, the directional transmission and reception pattern may define orientation patterns for a directional transmission antenna array 552 and a directional reception antenna array 554 comprised within the booster 550. In some embodiments, communications component 506 may be operative to send directional antenna orientation information 518 to the booster 550 that describes the directional transmission and reception pattern, and the booster 550 may be operative to implement the directional transmission and reception pattern based on the directional antenna orientation information 518. The embodiments are not limited in this context.

In various embodiments, coverage management component 520 may be operative to select the directional transmission and reception pattern for booster 550 based on knowledge of the typical distribution of mobile devices within a coverage area of booster 550. For example, coverage management component 520 may be operative to select the directional transmission and reception pattern for booster 550 such that increased coverage is provided to a known hotspot within the coverage area of booster 550. In some embodiments, coverage management component 520 may be operative to select and/or modify the directional transmission and reception pattern for booster 550 based on information describing the actual distribution of mobile devices within the coverage area of booster 550. For example, coverage management component 520 may be operative to receive information from booster 550 and/or from one or more mobile devices within the coverage area of booster 550 indicating that a large number of mobile devices are clustered in a particular sub-region that is not a known hotspot. Based on this information, coverage management component 520 may be operative to select and/or modify the directional transmission and reception pattern for booster 550 such that increased coverage is provided to that sub-region. The embodiments are not limited to these examples.

In various embodiments, according to the directional transmission and reception pattern that coverage management component 520 selects for booster 550, there may be a universally applicable time offset between an orientation pattern of directional transmission antenna array 552 and an orientation pattern of directional reception antenna array 554. For example, coverage management component 520 may be operative to implement a directional transmission and reception pattern that defines a time offset T, according to which the orientation of directional transmission antenna array 552 at any arbitrary time x may be the same as the orientation of directional reception antenna array 554 at the subsequent time x+T. The embodiments are not limited in this context.

In some embodiments, a mobile device 570 that wishes to obtain service from booster 550 may need to transmit a link establishment message 510 to booster 550. In various embodiments, link establishment message 510 may comprise a response to a reference signal, such as reference signal 308 of FIG. 3 and/or reference signal 408 of FIG. 4, that may be sent by booster 550. In various embodiments, link establishment message 510 may comprise a beacon response. In some embodiments, link establishment message 510 may comprise a random access preamble. In various embodiments, in order for booster 550 to properly receive the link establishment message 510, mobile device 550 may need to transmit the link establishment message 510 at a time at which directional reception antenna array 554 is oriented approximately towards mobile device 550. In some embodiments, this may depend on the directional transmission and reception pattern implemented by booster 550, and mobile device 570 may not have knowledge of this pattern. The embodiments are not limited in this context.

In various embodiments, communications component 506 may be operative to send a system information message 512 comprising timing offset information 514 that mobile device 570 may use to determine a time at which to send link establishment message 510 to booster 550. In some embodiments, system information message 512 may comprise an omni-directional transmission. In various embodiments, system information message 512 may comprise an enhanced system information broadcast message. In some embodiments, timing offset information 514 may comprise a universally applicable time offset between an orientation pattern of directional transmission antenna array 552 and an orientation pattern of directional reception antenna array 554 at booster 550. In various embodiments, communications component 506 may be operative to determine the timing offset information 514 based on the directional transmission and reception pattern described by directional antenna orientation information 518. In some embodiments, coverage management component 520 may be operative to select directional transmission and reception patterns for multiple boosters. In various such embodiments, communications component 506 may be operative to include multiple sets of timing offset information 514 in system information message 512, each set of timing offset information 514 corresponding to a different booster. The embodiments are not limited in this context.

In some embodiments, mobile device 570 may be operative to receive the system information message 512 and to determine a time at which to send link establishment message 510 to booster 550 based on the timing offset information 514. In various embodiments, mobile device 570 may be operative to determine the time at which to send link establishment message 510 to booster 550 based on the timing offset information 514 and on a time at which it received a reference signal from booster 550. In some embodiments, system information message 512 may comprise multiple sets of timing offset information 514, each corresponding to a different booster. In various such embodiments, mobile device 570 may be operative to identify timing offset information 514 corresponding to the booster 550 by which it is served, and to determine the time at which to send link establishment message 510 to the booster 550 based on that identified timing offset information 514. The embodiments are not limited in this context.

In some embodiments, communications component 506 may be operative to construct system information message 512 according to a particular format. In various embodiments, for example, system information message 512 may comprise a system information block. Presented in abstract syntax notation below is a SystemInformationBlockType17 information element such as may comprise an example of a format for system information message 512 in some embodiments:

```
SystemInformationBlockType17 ::= SEQUENCE (SIZE (32)) OF
                                            mmWaveBeamInformation;
mmWaveBeamInformation ::= SEQUENCE {
    SmallCellIdentifier          BIT STRING (SIZE (64))
    mmWaveSupport                BOOLEAN
    FrequencyDL                  ENUMERATED ( )
    FrequencyUL                  ENUMERATED ( )
    BeaconMovement               ENUMERATED (Swipe, Stepwise)
    BeaconPattern                ENUMERATED (p1, p2, p3, ..., p32)
    OverlapIndicator             ENUMERATED (non, partial, full)
    TXBeamWidth                  to be defined
    TXBeamRadius                 to be defined
    CoverageSectorIdentifierSupport  BOOLEAN
    BeaconDwellTime              INTEGER (0..2000)
    TXRXBeamOffset               INTEGER (0..2000)
    RXBeamDuration               INTEGER (0..2000)
    Tolerance                    INTEGER (0..500)
}
```

In the above example system information block, the SmallCellIdentifier parameter may comprise an identifier for a cell comprising a coverage area of a booster such as booster 550. The FrequencyDL parameter may indicate a frequency band or carrier frequency for mmWave transmissions by the booster. The FrequencyUL parameter may indicate a frequency band or carrier frequency for mmWave transmissions to the booster. The BeaconMovement parameter may indicate a type of movement of a directive radio beam of the booster. The BeaconPattern parameter may comprise a reference to one of a number of predefined orientation patterns. The OverlapIndicator parameter may be used to provide information describing the nature of any overlap in coverage with respect to consecutive transmission orientations of the booster. The CoverageSectorIdentifierSupport parameter may indicate whether reference signals sent by the booster contain coverage sector IDs. The BeaconDwellTime parameter may indicate a dwell time of the transmission orientation pattern for the booster. The TXRXBeamOffset parameter may identify a time offset for use by mobile devices to determine the times at which they transmit link establishment messages to the booster, such as the parameter T discussed with respect to FIG. 3. The RXBeamDuration parameter may be used to inform mobile devices of a size of a time window for sending link establishment messages to the booster. The Tolerance parameter may indicate a maximum acceptable delay value for sending link establishment messages to the booster. Such link establishment messages may comprise responses to reference signals sent by the booster, such as reference signal 308 of FIG. 3 and/or reference signal 408 of FIG. 4. The embodiments are not limited to these examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
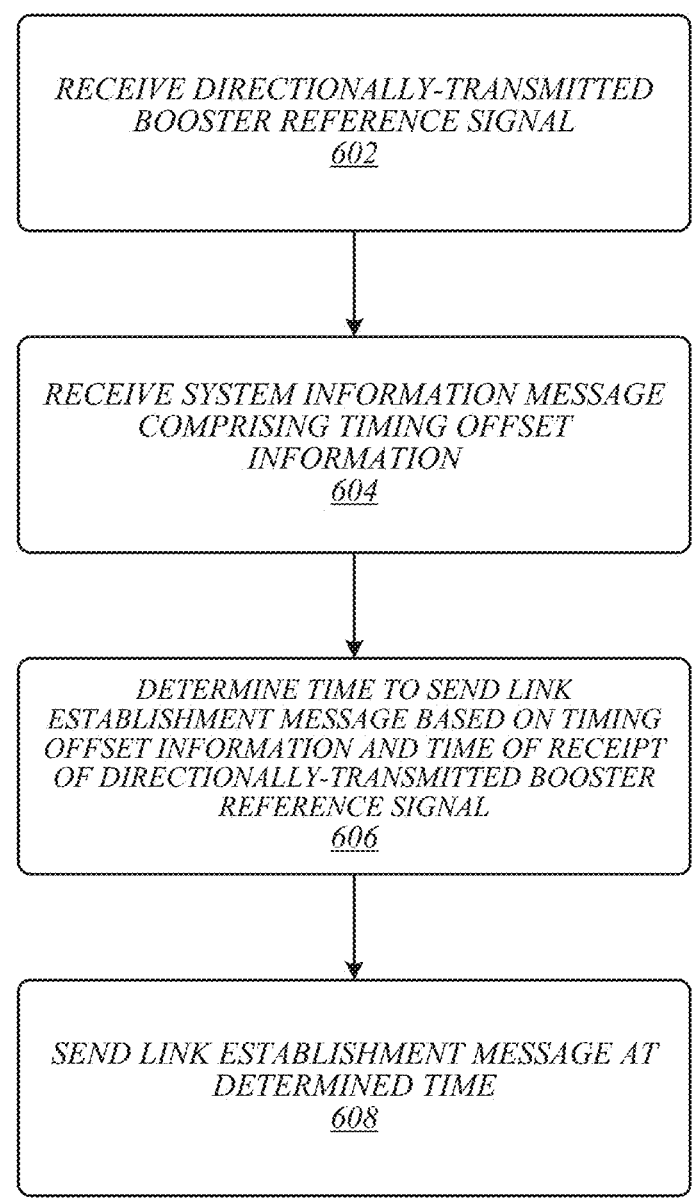
FIG. 6 illustrates an embodiment of a first logic flow.

FIG. 6 illustrates one embodiment of a logic flow 600, which may be representative of the operations executed by one or more embodiments described herein. More particularly, logic flow 600 may be representative of operations executed by a mobile device 106 of FIG. 1, apparatus 300 and/or system 340 of FIG. 3, mobile device 470 of FIG. 4, and/or mobile device 570 of FIG. 5. As shown in logic flow 600, a directionally-transmitted booster reference signal may be received at 602. For example, apparatus 300 and/or system 340 of FIG. 3 may be operative to receive reference signal 308 from booster 350, which may directionally transmit reference signal 308. At 604, a system information message may be received that comprises timing offset information. For example, apparatus 300 and/or system 340 of FIG. 3 may be operative to receive system information message 312 from anchor 360, and system information message 312 may comprise timing offset information 314.

At 606, a time at which to send a link establishment message may be determined based on the timing offset information and on a time of receipt of the directionally-transmitted booster reference signal. For example communications component 306 of FIG. 3 may be operative to determine a time at which to send link establishment message 310 based on timing offset information 314 and on a time at which it received reference signal 308. At 608, the link establishment message may be sent at the determined time. For example, communications component 306 may be operative to send link establishment message 310 at the determined time. The embodiments are not limited to these examples.

Figure 7:
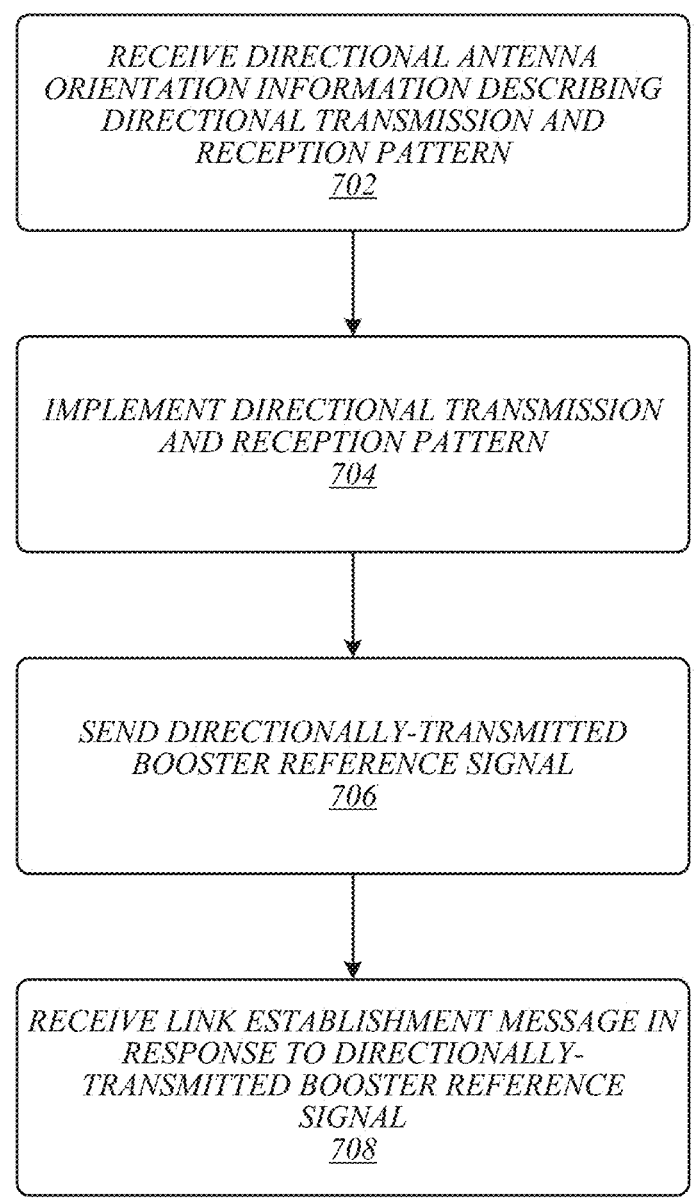
FIG. 7 illustrates an embodiment of a second logic flow.

FIG. 7 illustrates one embodiment of a logic flow 700, which may be representative of the operations executed by one or more embodiments described herein. More particularly, logic flow 700 may be representative of operations executed by booster 108 of FIG. 1, booster 350 of FIG. 3, apparatus 400 and/or system 440 of FIG. 4, and/or booster 550 of FIG. 5. As shown in logic flow 700, directional antenna orientation information describing a directional transmission and reception pattern may be received at 702. For example, apparatus 400 and/or system 440 of FIG. 4 may be operative to receive directional antenna orientation information 418 from anchor 460, and directional antenna orientation information 418 may describe a directional transmission and reception pattern. In some embodiments, the directional transmission and reception pattern may define a timing offset between a directional orientation of a transmission antenna array of the booster and a directional orientation of a reception antenna array of the booster. At 704, the directional transmission and reception pattern may be implemented. For example, directional antenna management component 416 of FIG. 4 may be operative to implement the directional transmission and reception pattern described by directional antenna orientation information 418 by controlling the orientations of directional transmission antenna array 452 and directional reception antenna array 454.

At 706, a directionally-transmitted booster reference signal may be sent. For example, communications component 406 of FIG. 4 may be operative on directional transmission antenna array 452 to directionally transmit reference signal 408. At 708, a link establishment message may be received in response to the directionally-transmitted booster reference signal. For example, apparatus 400 and/or system 440 of FIG. 4 may be operative on directional reception antenna array 454 to receive link establishment message 410 from mobile device 470 in response to reference signal 408. The embodiments are not limited to these examples.

Figure 8:
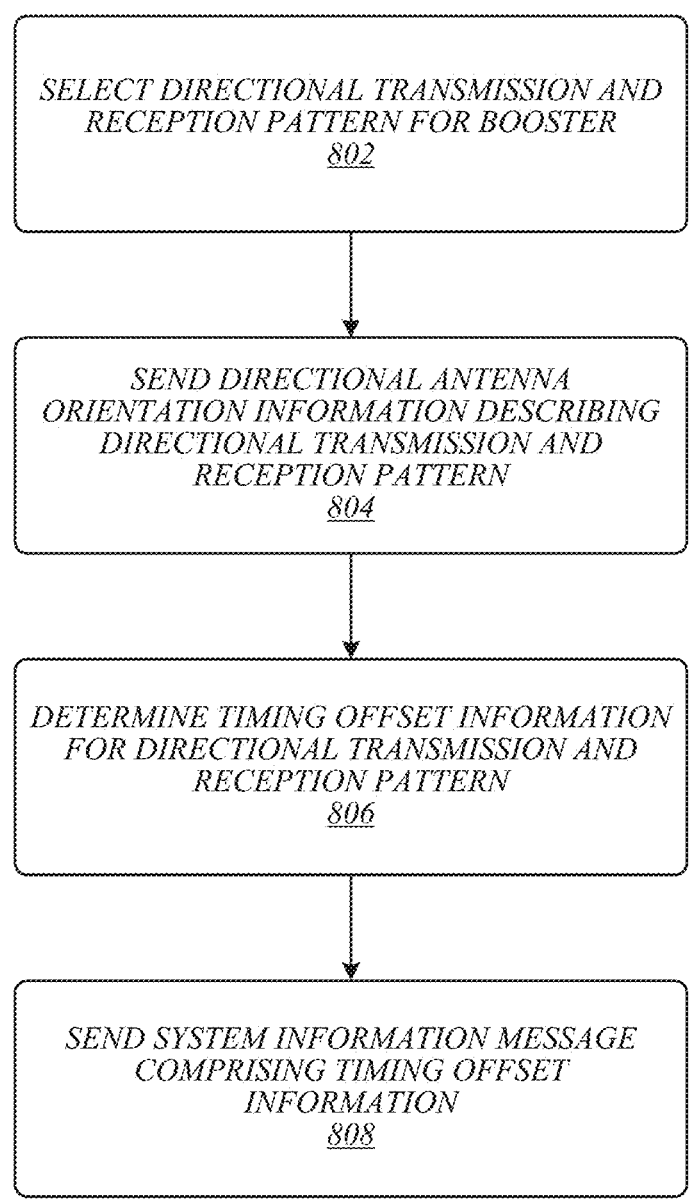
FIG. 8 illustrates an embodiment of a third logic flow.

FIG. 8 illustrates one embodiment of a logic flow 800, which may be representative of the operations executed by one or more embodiments described herein. More particularly, logic flow 800 may be representative of operations executed by an anchor 102 of FIG. 1, anchor 360 of FIG. 3, anchor 460 of FIG. 4, and/or apparatus 500 and/or system 540 of FIG. 5. As shown in logic flow 800, a directional transmission and reception pattern may be selected for a booster at 802. For example, coverage management component 520 of FIG. 5 may be operative to select a directional transmission and reception pattern for booster 550. In some embodiments, the directional transmission and reception pattern may define a timing offset between a directional orientation of a transmission antenna array of the booster and a directional orientation of a reception antenna array of the booster. At 804, directional antenna orientation information may be sent that describes the directional transmission and reception pattern. For example, communications component 506 of FIG. 5 may be operative to send directional antenna orientation information 518 that describes a selected directional transmission and reception pattern to booster 550.

At 806, timing offset information may be determined for the directional transmission and reception pattern. For example, communications component 506 of FIG. 5 may be operative to a determine timing offset information 514 for the directional transmission and reception pattern selected for booster 550. At 808, a system information message may be sent that comprises the timing offset information. For example, communications component 506 of FIG. 5 may be operative to a send system information message 512 that comprises the timing offset information 514. The embodiments are not limited to these examples.

Figure 9:
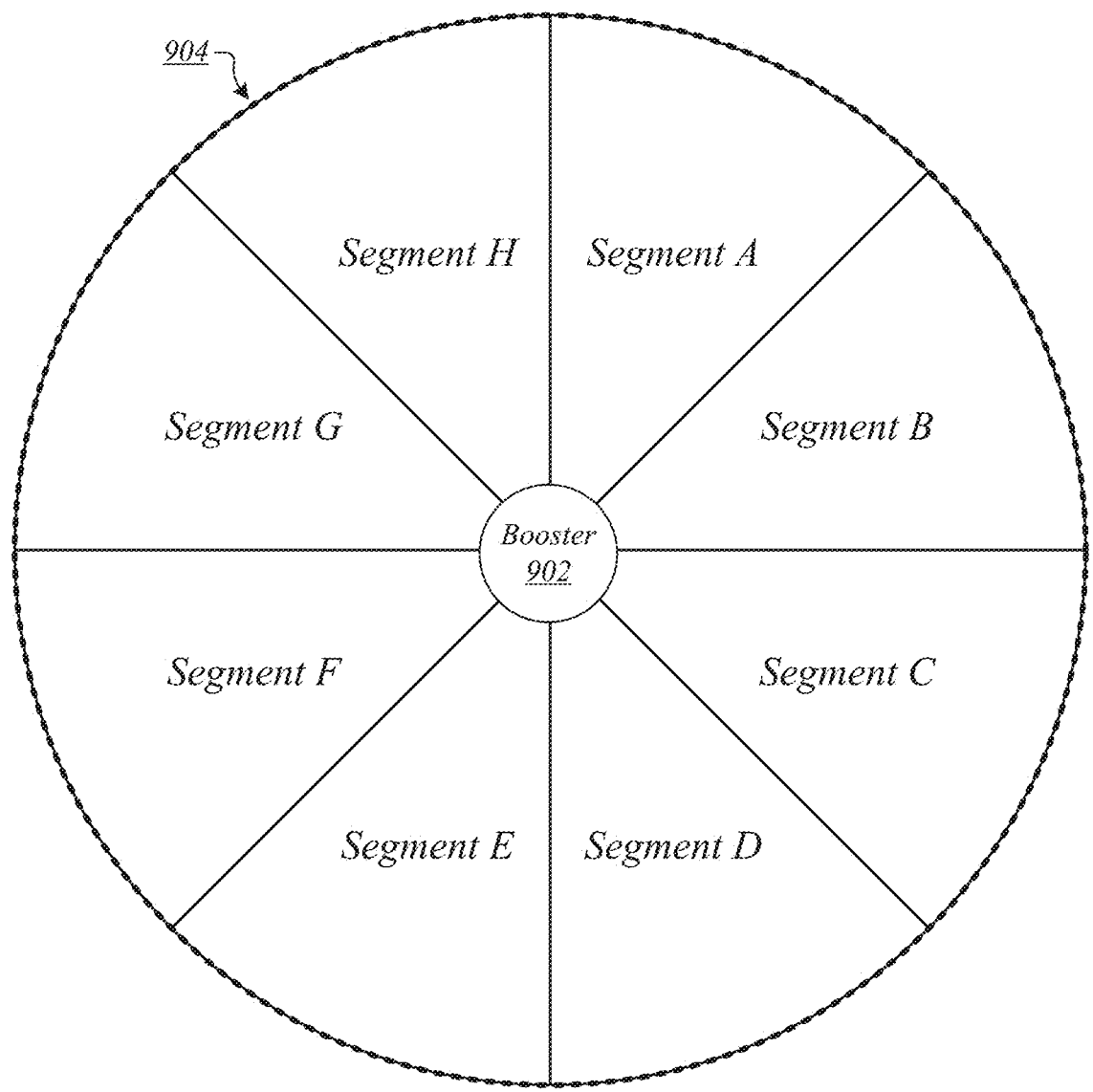
FIG. 9 illustrates an embodiment of a coverage area subdivision scheme.

FIG. 9 illustrates an embodiment of a coverage area subdivision scheme 900 such as may be representative of various embodiments. More particularly, coverage area subdivision scheme 900 may comprise an example of a coverage area subdivision scheme defined by a directional transmission and reception pattern, such as may be implemented by booster 108 of FIGS. 1 and/or 2, booster 350 of FIG. 3, apparatus 400 and/or system 440 of FIG. 4, and/or booster 550 of FIG. 5. According to coverage area subdivision scheme 900 of FIG. 9, a coverage area 904 of a booster 902 is subdivided into a plurality of segments. Specifically, coverage area 904 is subdivided into eight equally-sized segments A-H, each of which spans 45 respective degrees about the polar origin defined by booster 902. For purposes of explanation, this example coverage area subdivision scheme 900 will be discussed below in reference to various example directional transmission and reception pattern embodiments. However, it is to be understood that the embodiments are not limited to this example coverage area subdivision scheme 900. In some embodiments, coverage areas may be subdivided into lesser or greater numbers of segments, and those segments may or may not be equal in size and/or shape. The embodiments are not limited in this context.

FIG. 10 illustrates an orientation schedule 1000 such as may be representative of an example of a directional transmission and reception pattern implemented in conjunction with example coverage area subdivision scheme 900 of FIG. 9. More particularly, orientation schedule 1000 comprises an example of a pattern according to which, at each step in the schedule, a directional orientation jumps to an adjacent sector in a clockwise direction about booster 902 of FIG. 9. In various embodiments, either or both of a directional transmission orientation and a directional reception orientation may follow the directional orientation pattern defined in orientation schedule 1000. As such, the term orientation will hereinafter be used generically to refer to either or both. For each step in the first row of orientation schedule 1000, a segment served is listed in the second row, and indicates an orientation towards that segment. As shown in FIG. 10, at step 1, the orientation is towards segment A in coverage area subdivision scheme 900 of FIG. 9. At step 2, the orientation moves clockwise to the adjacent segment B. Similarly, at step 3, the orientation again moves clockwise, to adjacent segment C. At step 8, the orientation has proceeded around coverage area subdivision scheme 900 to segment H. Following step 8, the orientation schedule may return to step 1, corresponding to a clockwise movement from segment H to adjacent segment A in coverage area subdivision scheme 900.

In the interest of simplicity, the durations of each of the steps in orientation schedule 1000 have not been specified. It will be appreciated that if the steps are of equal duration, then the implementation of orientation schedule 1000 will result in equal respective amounts of time of orientation towards the various segments. However, it is to be understood that in some embodiments, the various steps may not necessarily be of equal duration. The embodiments are not limited in this context.

FIG. 11 illustrates an orientation schedule 1100 such as may be representative of another example of a directional transmission and reception pattern implemented in conjunction with example coverage area subdivision scheme 900 of FIG. 9. More particularly, orientation schedule 1100 comprises an example of a pattern according to which directional orientation jumps among segments in non-sequential fashion, rather than jumping to an adjacent segment at each step. Like orientation schedule 1000 of FIG. 10, orientation schedule 1100 comprises eight steps. Unlike the simple clockwise step movements defined by orientation schedule 1000, the movements defined by orientation schedule 1100 involve movements to non-adjacent segments. For example, rather than moving from segment A to adjacent segment B as it does at step 2 of orientation schedule 1000, orientation jumps to non-adjacent segment C at step 2 of orientation schedule 1100. Just as in orientation schedule 1000, each step in orientation schedule 1100 specifies orientation towards a different respective segment of coverage area subdivision scheme 900 of FIG. 9. As such, even though it specifies non-sequential jumps among segments, orientation schedule 1100 still may allocate coverage among those segments equally when the specified steps are of equal duration. The embodiments are not limited in this context.

In various embodiments, it may be desirable for a booster to implement a directional transmission and reception pattern that provides coverage to some coverage area segments more frequently and/or for longer periods of time than other coverage area segments. For example, if a disproportionally large number of mobile devices are located within segment A of coverage area 904 in FIG. 9, it may be desirable for booster 902 to provide coverage to segment A more frequently and/or for longer periods of time than it provides coverage to segments B-H. FIG. 12 illustrates an orientation schedule 1200 such as may be representative of a directional transmission and reception pattern that booster 902 might implement in order to provide more frequent coverage to segment A. According to orientation schedule 1200, directional orientation jumps among segments in non-sequential fashion, and is not equally distributed among those segments. Namely, orientation is towards segment A during three steps of orientation schedule 1200, but is towards each of segments B-H during only one respective step of orientation schedule 1200. The embodiments are not limited to this example.

It is worthy of note that with respect to directive radio beams and/or directive reception lobes such as directive radio beam 200 and/or directive reception lobe 210 of FIG. 2, there may be a tradeoff between beam/lobe reach and beam/lobe width. In order for a beam or lobe to reach a further distance away from a booster, that beam or lobe may need to be narrower. Similarly, if a beam or lobe is to provide coverage within a wide angle about the booster, that beam or lobe may not be able to reach as far from the booster as a beam or lobe that provides coverage to a narrower angle. In some embodiments, the widths of the segments defined for a given coverage area may be defined in view of these considerations. In various embodiments, each segment of a coverage area may be narrow enough that a beam or lobe that is as wide as that segment reaches far enough away from the booster to provide coverage to the outermost portions of that segment. For example, coverage area subdivision scheme 900 of FIG. 9 may be defined such that the widths of segments A-H are narrow enough that, for each segment, a beam or lobe originating from booster 902 can cover the width of that segment while still reaching at least as far as the outer boundary of coverage area 904. The embodiments are not limited in this context.

In some other embodiments, the tradeoff between beam/lobe reach and beam/lobe width may be exploited to provide additional coverage to mobile devices that are, for instance, closer to the booster. For example, in various embodiments, a booster such as booster 902 of FIG. 9 may alternate between a primary orientation schedule that provides coverage to all portions of a coverage area and a supplemental orientation schedule that provides extra coverage to portions of the coverage area that are, for instance, closer to booster 902. In another embodiment, the supplemental orientation schedule may be chose to provide extra coverage to portions of the coverage area that are, for instance, farther away from the booster 902. In some embodiments, the booster may use beamforming techniques to form narrower beams/lobes during execution of the primary orientation schedule and to form wider beams/lobes during execution of the supplemental orientation schedule, or vice versa. In various embodiments, rather than simply alternating between the primary and supplemental orientation schedules, the booster may switch between them according to other patterns and/or proportions. In some embodiments, more than two orientations schedules may be defined, which may correspond to more than two respective beam/lobe widths, and the booster may switch among those various orientation schedules and beam/lobe widths according to any of various possible patterns and/or proportions. The embodiments are not limited in this context.

It is worthy of note that in some embodiments, rather than being disseminated by a booster, a directionally-transmitted reference signal such as reference signal 308 of FIG. 3 and/or reference signal 408 of FIG. 4 may be disseminated by another type of fixed device, such as a macro base station or eNB. For example, in various embodiments, a directionally-transmitted reference signal may be disseminated by anchor 360 of FIG. 3, anchor 460 of FIG. 4, and/or apparatus 500 and/or system 540 of FIG. 5. Likewise, in some embodiments, rather than being received by a booster, a link establishment message sent in response to a directionally-transmitted reference signal may be received by another type of fixed device, such as a macro base station or eNB. For example, in various embodiments, a link establishment message sent in response to a directionally-transmitted reference signal may be received by anchor 360 of FIG. 3, anchor 460 of FIG. 4, and/or apparatus 500 and/or system 540 of FIG. 5. The embodiments are not limited in this context.

Figure 13:
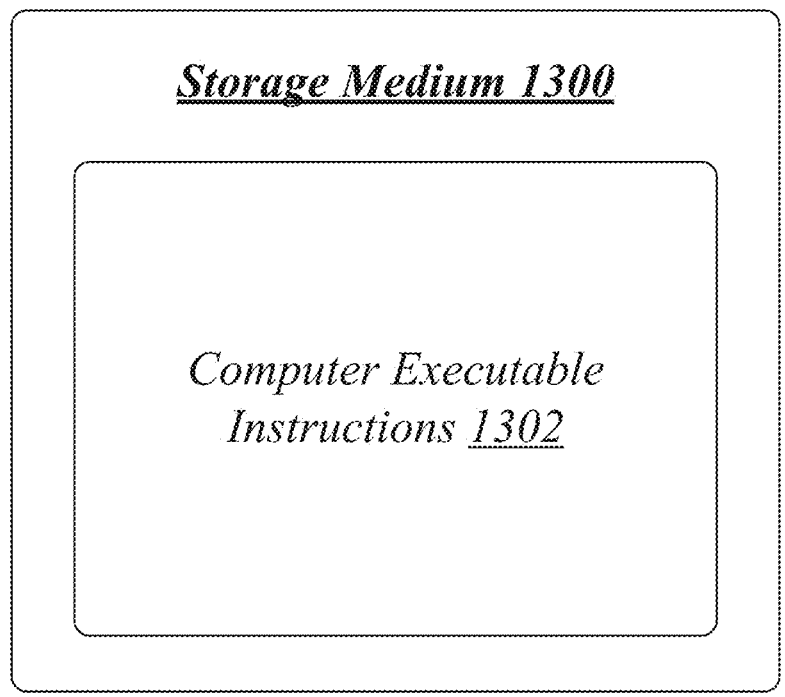
FIG. 13 illustrates an embodiment of a storage medium.

FIG. 13 illustrates an embodiment of a storage medium 1300. The storage medium 1300 may comprise an article of manufacture. In one embodiment, the storage medium 1300 may comprise any non-transitory computer-readable medium or machine-readable medium, such as an optical, magnetic or semiconductor storage. The storage medium may store various types of computer-executable instructions 1302, such as instructions that, when executed, cause a device to perform communications according to communications flow 600 of FIG. 6, communications flow 700 of FIG. 7, and/or communications flow 800 of FIG. 8. Examples of a computer-readable or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 14:
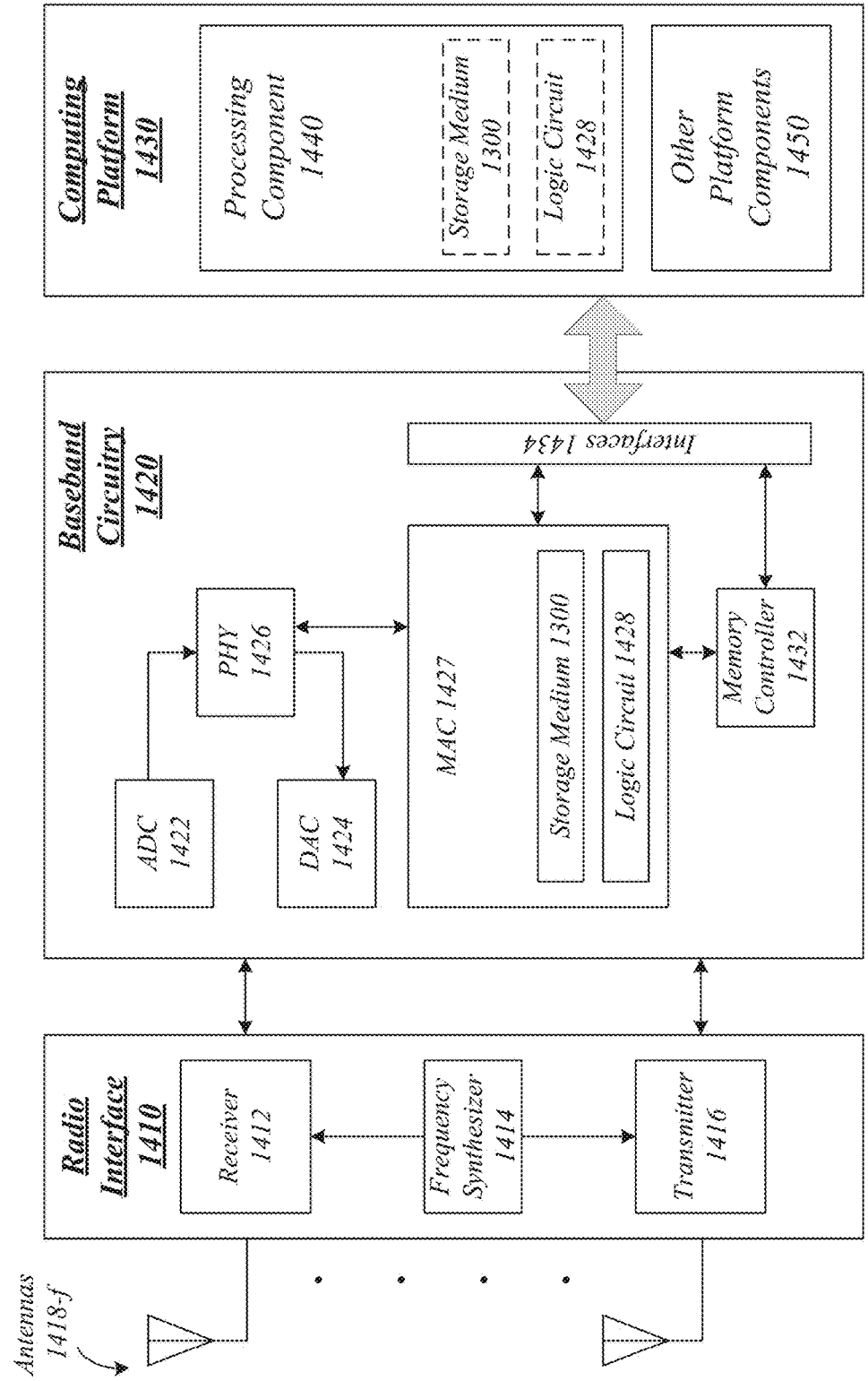
FIG. 14 illustrates an embodiment of a device.

FIG. 14 illustrates an embodiment of a communications device 1400 that may implement one or more of apparatus 300 and/or system 340 of FIG. 3, apparatus 400 and/or system 440 of FIG. 4, apparatus 500 and/or system 540 of FIG. 5, communications flow 600 of FIG. 6, communications flow 700 of FIG. 7, communications flow 800 of FIG. 8, and/or storage medium 1300 of FIG. 13. In various embodiments, device 1400 may comprise a logic circuit 1428. The logic circuit 1428 may include physical circuits to perform operations described for one or more of apparatus 300 and/or system 340 of FIG. 3, apparatus 400 and/or system 440 of FIG. 4, and/or apparatus 500 and/or system 540 of FIG. 5, for example. As shown in FIG. 14, device 1400 may include a radio interface 1410, baseband circuitry 1420, and computing platform 1430, although the embodiments are not limited to this configuration.

The device 1400 may implement some or all of the structure and/or operations for one or more of apparatus 300 and/or system 340 of FIG. 3, apparatus 400 and/or system 440 of FIG. 4, apparatus 500 and/or system 540 of FIG. 5, communications flow 600 of FIG. 6, communications flow 700 of FIG. 7, communications flow 800 of FIG. 8, storage medium 1300 of FIG. 13, and logic circuit 1428 in a single computing entity, such as entirely within a single device. Alternatively, the device 1400 may distribute portions of the structure and/or operations for one or more of apparatus 300 and/or system 340 of FIG. 3, apparatus 400 and/or system 440 of FIG. 4, apparatus 500 and/or system 540 of FIG. 5, communications flow 600 of FIG. 6, communications flow 700 of FIG. 7, communications flow 800 of FIG. 8, storage medium 1300 of FIG. 13, and logic circuit 1428 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1410 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1410 may include, for example, a receiver 1412, a frequency synthesizer 1414, and/or a transmitter 1416. Radio interface 1410 may include bias controls, a crystal oscillator and/or one or more antennas 1418-*f*. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1426 for PHY link layer processing of respective receive/transmit signals. Baseband circuitry 1420 may include, for example, a medium access control (MAC) processing circuit 1427 for MAC/data link layer processing. Baseband circuitry 1420 may include a memory controller 1432 for communicating with MAC processing circuit 1427 and/or a computing platform 1430, for example, via one or more interfaces 1434.

In some embodiments, PHY processing circuit 1426 may include a frame construction and/or detection module, in combination with additional circuitry such as a buffer memory, to construct and/or deconstruct communication frames. Alternatively or in addition, MAC processing circuit 1427 may share processing for certain of these functions or perform these processes independent of PHY processing circuit 1426. In some embodiments, MAC and PHY processing may be integrated into a single circuit.

The computing platform 1430 may provide computing functionality for the device 1400. As shown, the computing platform 1430 may include a processing component 1440. In addition to, or alternatively of, the baseband circuitry 1420, the device 1400 may execute processing operations or logic for one or more of apparatus 300 and/or system 340 of FIG. 3, apparatus 400 and/or system 440 of FIG. 4, apparatus 500 and/or system 540 of FIG. 5, communications flow 600 of FIG. 6, communications flow 700 of FIG. 7, communications flow 800 of FIG. 8, storage medium 1300 of FIG. 13, and logic circuit 1428 using the processing component 1440. The processing component 1440 (and/or PHY 1426 and/or MAC 1427) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1400 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1400 described herein, may be included or omitted in various embodiments of device 1400, as suitably desired.

Embodiments of device 1400 may be implemented using single input single output (SISO) architectures. However, certain implementations may include multiple antennas (e.g., antennas 1418-*f*) for transmission and/or reception using adaptive antenna techniques for beamforming or spatial division multiple access (SDMA) and/or using MIMO communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 15:
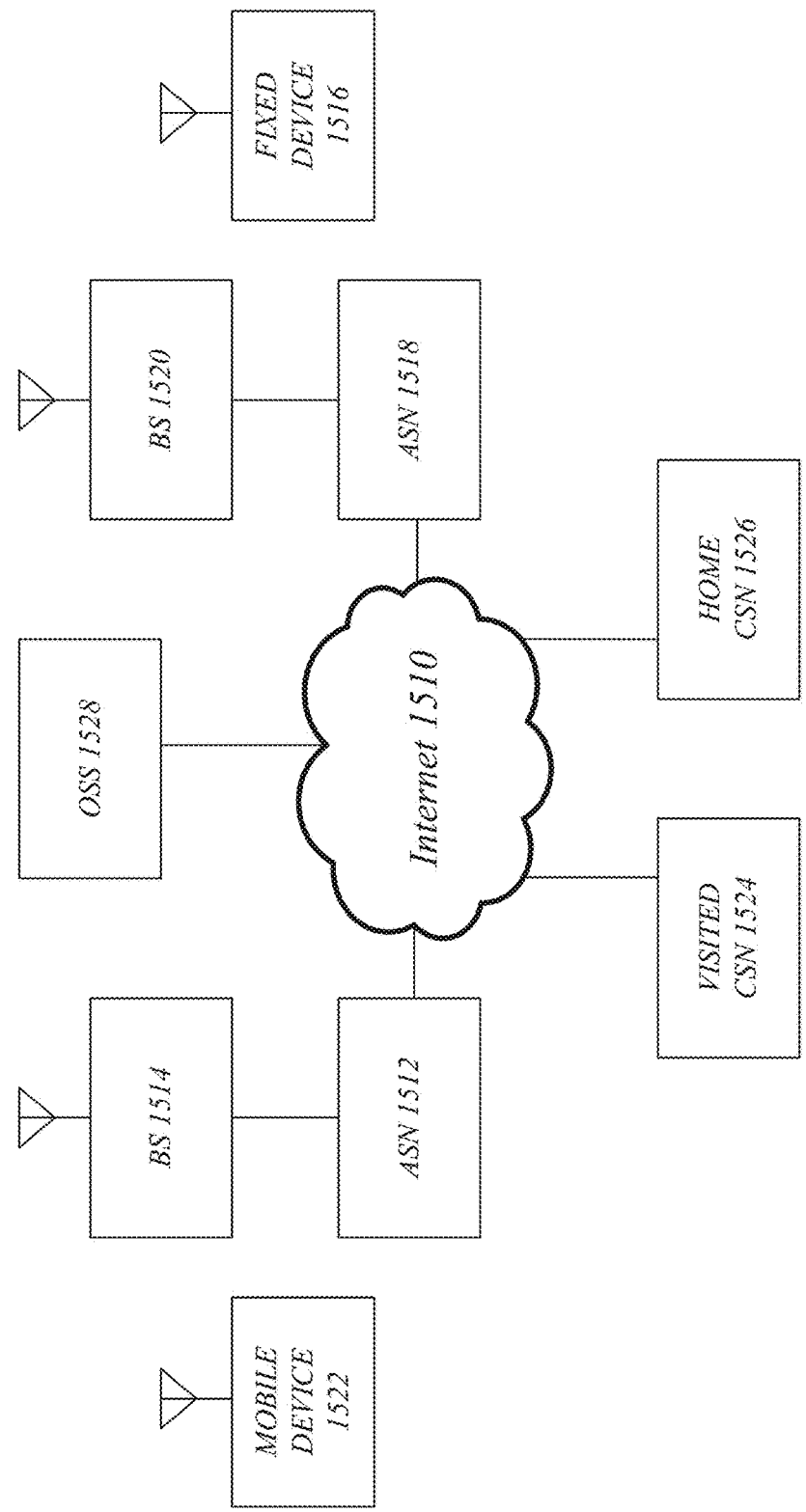
FIG. 15 illustrates an embodiment of a wireless network.

FIG. 15 illustrates an embodiment of a broadband wireless access system 1500. As shown in FIG. 15, broadband wireless access system 1500 may be an internet protocol (IP) type network comprising an internet 1510 type network or the like that is capable of supporting mobile wireless access and/or fixed wireless access to internet 1510. In one or more embodiments, broadband wireless access system 1500 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1500, access service networks (ASN) 1512, 1518 are capable of coupling with base stations (BS) (or eNodeBs) 1514, 1520, respectively, to provide wireless communication between one or more fixed devices 1516 and internet 1510 and/or between or one or more mobile devices 1522 and Internet 1510. One example of a fixed device 1516 and a mobile device 1522 is device 1400 of FIG. 14, with the fixed device 1516 comprising a stationary version of device 1400 and the mobile device 1522 comprising a mobile version of device 1400. ASNs 1512, 1518 may implement profiles that are capable of defining the mapping of network functions to one or more physical entities on broadband wireless access system 1500. Base stations (or eNodeBs) 1514, 1520 may comprise radio equipment to provide RF communication with fixed device 1516 and/or mobile device 1522, such as described with reference to device 1400, and may comprise, for example, the PHY and MAC layer equipment in compliance with a 3GPP LTE Specification or an IEEE 802.16 Standard. Base stations (or eNodeBs) 1514, 1520 may further comprise an IP backplane to couple to Internet 1510 via ASNs 1512, 1518, respectively, although the scope of the claimed subject matter is not limited in these respects.

Broadband wireless access system 1500 may further comprise a visited connectivity service network (CSN) 1524 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1524 or home CSN 1526, and the scope of the claimed subject matter is not limited in these respects. Visited CSN 1524 may be referred to as a visited CSN in the case where visited CSN 1524 is not part of the regular service provider of fixed device 1516 or mobile device 1522, for example where fixed device 1516 or mobile device 1522 is roaming away from its respective home CSN 1526, or where broadband wireless access system 1500 is part of the regular service provider of fixed device 1516 or mobile device 1522 but where broadband wireless access system 1500 may be in another location or state that is not the main or home location of fixed device 1516 or mobile device 1522.

Fixed device 1516 may be located anywhere within range of one or both base stations (or eNodeBs) 1514, 1520, such as in or near a home or business to provide home or business customer broadband access to Internet 1510 via base stations (or eNodeBs) 1514, 1520 and ASNs 1512, 1518, respectively, and home CSN 1526. It is worthy of note that although fixed device 1516 is generally disposed in a stationary location, it may be moved to different locations as needed. Mobile device 1522 may be utilized at one or more locations if mobile device 1522 is within range of one or both base stations (or eNodeBs) 1514, 1520, for example.

In accordance with one or more embodiments, operation support system (OSS) 1528 may be part of broadband wireless access system 1500 to provide management functions for broadband wireless access system 1500 and to provide interfaces between functional entities of broadband wireless access system 1500. Broadband wireless access system 1500 of FIG. 15 is merely one type of wireless network showing a certain number of the components of broadband wireless access system 1500, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a wireless communication apparatus, comprising logic, at least a portion of which is in hardware, the logic to receive a directionally-transmitted booster reference signal, receive a system information message comprising timing offset information, and determine a time at which to send a link establishment message based on the timing offset information and a time of receipt of the directionally-transmitted booster reference signal.

In Example 2, the timing offset information of Example 1 may optionally correspond to a directional transmission and reception pattern according to which a transmission orientation of a booster continually changes.

In Example 3, the logic of any of Examples 1 to 2 may optionally receive the directionally-transmitted booster reference signal over a millimeter wave (mmWave) frequency channel.

In Example 4, the link establishment message of any of Examples 1 to 3 may optionally comprise a random access preamble or a beacon response.

In Example 5, the logic of any of Examples 1 to 4 may optionally include a coverage sector identifier in the link establishment message.

In Example 6, the logic of any of Examples 1 to 5 may optionally include a booster identifier in the link establishment message.

In Example 7, the directionally-transmitted booster reference signal of any of Examples 1 to 6 may optionally comprise a coverage sector identifier.

In Example 8, the system information message of any of Examples 1 to 7 may optionally comprise timing offset information for each of a plurality of boosters.

Example 9 is a system, comprising a wireless communication apparatus according to any of Examples 1 to 8, a display, a radio frequency (RF) transceiver, and one or more RF antennas.

Example 10 is at least one non-transitory computer-readable storage medium comprising a set of wireless communication instructions that, in response to being executed on a computing device, cause the computing device to receive a directionally-transmitted booster reference signal, receive a system information message comprising timing offset information, and determine a time at which to send a link establishment message based on the timing offset information and a time of receipt of the directionally-transmitted booster reference signal.

In Example 11, the timing offset information of Example 10 may optionally correspond to a directional transmission and reception pattern according to which a transmission orientation of a booster continually changes.

In Example 12, the at least one non-transitory computer-readable storage medium of any of Examples 10 to 11 may optionally comprise wireless communication instructions that, in response to being executed on the computing device, cause the computing device to receive the directionally-transmitted booster reference signal over a millimeter wave (mmWave) frequency channel.

In Example 13, the link establishment message of any of Examples 10 to 12 may optionally comprise a random access preamble or a beacon response.

In Example 14, the at least one non-transitory computer-readable storage medium of any of Examples 10 to 13 may optionally comprise wireless communication instructions that, in response to being executed on the computing device, cause the computing device to include a coverage sector identifier in the link establishment message.

In Example 15, the at least one non-transitory computer-readable storage medium of any of Examples 10 to 14 may optionally comprise wireless communication instructions that, in response to being executed on the computing device, cause the computing device to include a booster identifier in the link establishment message.

In Example 16, the directionally-transmitted booster reference signal of any of Examples 10 to 15 may optionally comprise a coverage sector identifier.

In Example 17, the system information message of any of Examples 10 to 16 may optionally comprise timing offset information for each of a plurality of boosters.

Example 18 is a wireless communication method, comprising receiving a directionally-transmitted booster reference signal, receiving a system information message comprising timing offset information, and determining, by a processor circuit, a time at which to send a link establishment message based on the timing offset information and a time of receipt of the directionally-transmitted booster reference signal.

In Example 19, the timing offset information of Example 18 may optionally correspond to a directional transmission and reception pattern according to which a transmission orientation of a booster continually changes.

In Example 20, the wireless communication method of any of Examples 18 to 19 may optionally comprise receiving the directionally-transmitted booster reference signal over a millimeter wave (mmWave) frequency channel.

In Example 21, the link establishment message of any of Examples 18 to 20 may optionally comprise a random access preamble or a beacon response.

In Example 22, the wireless communication method of any of Examples 18 to 21 may optionally comprise including a coverage sector identifier in the link establishment message.

In Example 23, the wireless communication method of any of Examples 18 to 22 may optionally comprise including a booster identifier in the link establishment message.

In Example 24, the directionally-transmitted booster reference signal of any of Examples 18 to 23 may optionally comprise a coverage sector identifier.

In Example 25, the system information message of any of Examples 18 to 24 may optionally comprise timing offset information for each of a plurality of boosters.

Example 26 is at least one machine-readable medium comprising a set of instructions that, in response to being executed on a computing device, cause the computing device to perform a wireless communication method according to any of Examples 18 to 25.

Example 27 is an apparatus, comprising means for performing a wireless communication method according to any of Examples 18 to 25.

Example 28 is a system, comprising an apparatus according to Example 27, a display, a radio frequency (RF) transceiver, and one or more RF antennas.

Example 29 is a wireless communication apparatus, comprising means for receiving a directionally-transmitted booster reference signal, means for receiving a system information message comprising timing offset information, and means for determining a time at which to send a link establishment message based on the timing offset information and a time of receipt of the directionally-transmitted booster reference signal.

In Example 30, the timing offset information of Example 29 may optionally correspond to a directional transmission and reception pattern according to which a transmission orientation of a booster continually changes.

In Example 31, the wireless communication apparatus of any of Examples 29 to 30 may optionally comprise means for receiving the directionally-transmitted booster reference signal over a millimeter wave (mmWave) frequency channel.

In Example 32, the link establishment message of any of Examples 29 to 31 may optionally comprise a random access preamble or a beacon response.

In Example 33, the wireless communication apparatus of any of Examples 29 to 32 may optionally comprise means for including a coverage sector identifier in the link establishment message.

In Example 34, the wireless communication apparatus of any of Examples 29 to 33 may optionally comprise means for including a booster identifier in the link establishment message.

In Example 35, the directionally-transmitted booster reference signal of any of Examples 29 to 34 may optionally comprise a coverage sector identifier.

In Example 36, the system information message of any of Examples 29 to 35 may optionally comprise timing offset information for each of a plurality of boosters.

Example 37 is a system, comprising a wireless communication apparatus according to any of Examples 29 to 36, a display, a radio frequency (RF) transceiver, and one or more RF antennas.

Example 38 is a wireless communication apparatus, comprising logic, at least a portion of which is in hardware, the logic to send directional antenna orientation information describing a directional transmission and reception pattern for a booster, determine timing offset information for the directional transmission and reception pattern, and send a system information message comprising the timing offset information.

In Example 39, the system information message of Example 38 may optionally comprise a system information broadcast.

In Example 40, the system information message of any of Examples 38 to 39 may optionally comprise timing offset information for a plurality of boosters.

In Example 41, the directional transmission and reception pattern of any of Examples 38 to 40 may optionally define a plurality of coverage area segments.

In Example 42, the directional transmission and reception pattern of Example 41 may optionally allocate coverage equally among the plurality of coverage area segments.

In Example 43, the directional transmission and reception pattern of Example 41 may optionally provide more frequent coverage to at least one coverage area segment than to at least one other coverage area segment.

In Example 44, the timing offset information of any of Examples 38 to 43 may optionally identify a time offset between a transmission orientation and a reception orientation.

In Example 45, the logic of any of Examples 38 to 44 may optionally send the system information message via an omni-directional transmission.

Example 46 is a system, comprising a wireless communication apparatus according to any of Examples 38 to 45, a radio frequency (RF) transceiver, and one or more RF antennas.

Example 47 is at least one non-transitory computer-readable storage medium comprising a set of wireless communication instructions that, in response to being executed on a computing device, cause the computing device to send directional antenna orientation information describing a directional transmission and reception pattern for a booster, determine timing offset information for the directional transmission and reception pattern, and send a system information message comprising the timing offset information.

In Example 48, the system information message of Example 47 may optionally comprise a system information broadcast.

In Example 49, the system information message of any of Examples 47 to 48 may optionally comprise timing offset information for a plurality of boosters.

In Example 50, the directional transmission and reception pattern of any of Examples 47 to 49 may optionally define a plurality of coverage area segments.

In Example 51, the directional transmission and reception pattern of Example 50 may optionally allocate coverage equally among the plurality of coverage area segments.

In Example 52, the directional transmission and reception pattern of Example 50 may optionally provide more frequent coverage to at least one coverage area segment than to at least one other coverage area segment.

In Example 53, the timing offset information of any of Examples 47 to 52 may optionally identify a time offset between a transmission orientation and a reception orientation.

In Example 54, the at least one non-transitory computer-readable storage medium of any of Examples 47 to 53 may optionally comprise wireless communication instructions that, in response to being executed on the computing device, cause the computing device to send the system information message via an omni-directional transmission.

Example 55 is a wireless communication method, comprising sending directional antenna orientation information describing a directional transmission and reception pattern for a booster, determining, by a processor circuit, timing offset information for the directional transmission and reception pattern, and sending a system information message comprising the timing offset information.

In Example 56, the system information message of Example 55 may optionally comprise a system information broadcast.

In Example 57, the system information message of any of Examples 55 to 56 may optionally comprise timing offset information for a plurality of boosters.

In Example 58, the directional transmission and reception pattern of any of Examples 55 to 57 may optionally define a plurality of coverage area segments.

In Example 59, the directional transmission and reception pattern of Example 58 may optionally allocate coverage equally among the plurality of coverage area segments.

In Example 60, the directional transmission and reception pattern of Example 58 may optionally provide more frequent coverage to at least one coverage area segment than to at least one other coverage area segment.

In Example 61, the timing offset information of any of Examples 55 to 60 may optionally identify a time offset between a transmission orientation and a reception orientation.

In Example 62, the wireless communication method of any of Examples 55 to 61 may optionally comprise sending the system information message via an omni-directional transmission.

Example 63 is at least one machine-readable medium comprising a set of instructions that, in response to being executed on a computing device, cause the computing device to perform a wireless communication method according to any of Examples 55 to 62.

Example 64 is an apparatus, comprising means for performing a wireless communication method according to any of Examples 55 to 62.

Example 65 is a system, comprising an apparatus according to Example 64, a radio frequency (RF) transceiver, and one or more RF antennas.

Example 66 is a wireless communication apparatus, comprising means for sending directional antenna orientation information describing a directional transmission and reception pattern for a booster, means for determining timing offset information for the directional transmission and reception pattern, and means for sending a system information message comprising the timing offset information.

In Example 67, the system information message of Example 66 may optionally comprise a system information broadcast.

In Example 68, the system information message of any of Examples 66 to 67 may optionally comprise timing offset information for a plurality of boosters.

In Example 69, the directional transmission and reception pattern of any of Examples 66 to 68 may optionally define a plurality of coverage area segments.

In Example 70, the directional transmission and reception pattern of Example 69 may optionally allocate coverage equally among the plurality of coverage area segments.

In Example 71, the directional transmission and reception pattern of Example 69 may optionally provide more frequent coverage to at least one coverage area segment than to at least one other coverage area segment.

In Example 72, the timing offset information of any of Examples 66 to 71 may optionally identify a time offset between a transmission orientation and a reception orientation.

In Example 73, the wireless communication apparatus of any of Examples 66 to 72 may optionally comprise means for sending the system information message via an omnidirectional transmission.

Example 74 is a system, comprising a wireless communication apparatus according to any of Examples 66 to 73, a radio frequency (RF) transceiver, and one or more RF antennas.

Example 75 is a wireless communication apparatus, comprising logic, at least a portion of which is in hardware, the logic to receive directional antenna orientation information describing a directional transmission and reception pattern, implement the directional transmission and reception pattern at a booster, send a directionally-transmitted booster reference signal, and receive a link establishment message in response to the directionally-transmitted booster reference signal.

In Example 76, the directional transmission and reception pattern of Example 75 may optionally define a continually changing transmission orientation for the booster.

In Example 77, the directional transmission and reception pattern of Example 76 may optionally define a continuous rotation of the transmission orientation about the booster.

In Example 78, the directional transmission and reception pattern of Example 76 may optionally define a sequence of discrete jumps of the transmission orientation about the booster.

In Example 79, the logic of any of Examples 75 to 78 may optionally send the directionally-transmitted booster reference signal over a millimeter wave (mmWave) frequency channel.

In Example 80, the link establishment message of any of Examples 75 to 79 may optionally comprise a random access preamble.

In Example 81, the link establishment message of any of Examples 75 to 79 may optionally comprise a beacon response.

In Example 82, the logic of any of Examples 75 to 81 may optionally control one or more directional antenna orientations based on the directional transmission and reception pattern.

Example 83 is a system, comprising a wireless communication apparatus according to any of Examples 75 to 82, a radio frequency (RF) transceiver, and a directional transmission antenna array.

Example 84 is at least one non-transitory computer-readable storage medium comprising a set of wireless communication instructions that, in response to being executed on a computing device, cause the computing device to receive directional antenna orientation information describing a directional transmission and reception pattern, implement the directional transmission and reception pattern at a booster, send a directionally-transmitted booster reference signal, and receive a link establishment message in response to the directionally-transmitted booster reference signal.

In Example 85, the directional transmission and reception pattern of Example 84 may optionally define a continually changing transmission orientation for the booster.

In Example 86, the directional transmission and reception pattern of Example 85 may optionally define a continuous rotation of the transmission orientation about the booster.

In Example 87, the directional transmission and reception pattern of Example 85 may optionally define a sequence of discrete jumps of the transmission orientation about the booster.

In Example 88, the at least one non-transitory computer-readable storage medium of any of Examples 84 to 87 may optionally comprise wireless communication instructions that, in response to being executed on the computing device, cause the computing device to send the directionally-transmitted booster reference signal over a millimeter wave (mmWave) frequency channel.

In Example 89, the link establishment message of any of Examples 84 to 88 may optionally comprise a random access preamble.

In Example 90, the link establishment message of any of Examples 84 to 88 may optionally comprise a beacon response.

In Example 91, the at least one non-transitory computer-readable storage medium of any of Examples 84 to 90 may optionally comprise wireless communication instructions that, in response to being executed on the computing device, cause the computing device to control one or more directional antenna orientations based on the directional transmission and reception pattern.

Example 92 is a wireless communication method, comprising receiving directional antenna orientation information describing a directional transmission and reception pattern, implementing, by a processor circuit at a booster, the directional transmission and reception pattern, sending a directionally-transmitted booster reference signal, and receiving a link establishment message in response to the directionally-transmitted booster reference signal.

In Example 93, the directional transmission and reception pattern of Example 92 may optionally define a continually changing transmission orientation for the booster.

In Example 94, the directional transmission and reception pattern of Example 93 may optionally define a continuous rotation of the transmission orientation about the booster.

In Example 95, the directional transmission and reception pattern of Example 93 may optionally define a sequence of discrete jumps of the transmission orientation about the booster.

In Example 96, the wireless communication method of any of Examples 92 to 95 may optionally comprise sending the directionally-transmitted booster reference signal over a millimeter wave (mmWave) frequency channel.

In Example 97, the link establishment message of any of Examples 92 to 96 may optionally comprise a random access preamble.

In Example 98, the link establishment message of any of Examples 92 to 96 may optionally comprise a beacon response.

In Example 99, the wireless communication method of any of Examples 92 to 98 may optionally comprise controlling one or more directional antenna orientations based on the directional transmission and reception pattern.

Example 100 is at least one machine-readable medium comprising a set of instructions that, in response to being executed on a computing device, cause the computing device to perform a wireless communication method according to any of Examples 92 to 99.

Example 101 is an apparatus, comprising means for performing a wireless communication method according to any of Examples 92 to 99.

Example 102 is a system, comprising an apparatus according to Example 101, a radio frequency (RF) transceiver, and a directional transmission antenna array.

Example 103 is a wireless communication apparatus, comprising means for receiving directional antenna orientation information describing a directional transmission and reception pattern, means for implementing the directional transmission and reception pattern at a booster, means for sending a directionally-transmitted booster reference signal, and means for receiving a link establishment message in response to the directionally-transmitted booster reference signal.

In Example 104, the directional transmission and reception pattern of Example 103 may optionally define a continually changing transmission orientation for the booster.

In Example 105, the directional transmission and reception pattern of Example 104 may optionally define a continuous rotation of the transmission orientation about the booster.

In Example 106, the directional transmission and reception pattern of Example 104 may optionally define a sequence of discrete jumps of the transmission orientation about the booster.

In Example 107, the wireless communication apparatus of any of Examples 103 to 106 may optionally comprise means for sending the directionally-transmitted booster reference signal over a millimeter wave (mmWave) frequency channel.

In Example 108, the link establishment message of any of Examples 103 to 107 may optionally comprise a random access preamble.

In Example 109, the link establishment message of any of Examples 103 to 107 may optionally comprise a beacon response.

In Example 110, the wireless communication apparatus of any of Examples 103 to 109 may optionally comprise means for controlling one or more directional antenna orientations based on the directional transmission and reception pattern.

Example 111 is a system, comprising a wireless communication apparatus according to any of Examples 103 to 110, a radio frequency (RF) transceiver, and a directional transmission antenna array.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a memory; and
circuitry coupled with the memory, the circuitry to:
   receive directional antenna orientation information describing directional transmission and reception pattern, wherein the directional transmission and reception pattern defines a time offset T, according to which an orientation of directional transmission antenna array at any arbitrary time x may be an approximately same orientation of directional reception antenna array at a subsequent time x+T;
   implement the directional transmission and reception pattern by controlling the orientations of a directional transmission antenna array and a directional reception antenna array;
   send a directionally-transmitted booster reference signal based on the implemented directional transmission and reception pattern; and
   receive a link establishment message in response to the directionally-transmitted booster reference signal based on the implemented directional transmission and reception pattern.

2. The apparatus of claim 1, the circuitry to send the directionally-transmitted booster reference signal over a millimeter wave (mmWave) frequency channel.

3. The apparatus of claim 1, the link establishment message comprising a random access preamble or a beacon response.

4. The apparatus of claim 1, the circuitry to:
generate the reference signal, when the directional transmission antenna array is approximately oriented towards a particular coverage sector within a coverage area;
determine a coverage sector identifier (ID) for the coverage sector; and
include the coverage sector ID in the reference signal.

5. The apparatus of claim 1, wherein the circuitry comprised in an evolved Node B (eNB), and the circuitry to:
determine a booster identifier (ID) corresponding to the eNB;
include the booster ID in the reference signal; and
receive the booster ID in the link establishment message.

6. The apparatus of claim 1, comprising:
a display;
a radio frequency (RF) transceiver;
the directional transmission antenna array; and
the directional reception antenna array.

7. At least one non-transitory computer-readable storage medium comprising a set of instructions that, in response to being executed on a computing device, cause the computing device to:
   receive directional antenna orientation information describing directional transmission and reception pattern, wherein the directional transmission and reception pattern defines a time offset T, according to which an orientation of directional transmission antenna array at any arbitrary time x may be an approximately same orientation of directional reception antenna array at a subsequent time x+T;
   implement the directional transmission and reception pattern by controlling the orientations of a directional transmission antenna array and a directional reception antenna array;
   send a directionally-transmitted booster reference signal based on the implemented directional transmission and reception pattern; and
   receive a link establishment message in response to the directionally-transmitted booster reference signal based on the implemented directional transmission and reception pattern.

8. The at least one non-transitory computer-readable storage medium of claim 7, comprising instructions that, in response to being executed on the computing device, cause the computing device to send the directionally-transmitted booster reference signal over a millimeter wave (mmWave) frequency channel.

9. The at least one non-transitory computer-readable storage medium of claim 7, the link establishment message comprising a random access preamble or a beacon response.

10. The at least one non-transitory computer-readable storage medium of claim 7, comprising instructions that, in response to being executed on the computing device, cause the computing device to:
generate the reference signal, when the directional transmission antenna array is approximately oriented towards a particular coverage sector within a coverage area;
determine a coverage sector identifier (ID) for the coverage sector; and
include the coverage sector ID in the reference signal.

11. The at least one non-transitory computer-readable storage medium of claim 7, comprising instructions that, in response to being executed on the computing device, cause the computing device to:
determine a booster identifier (ID) corresponding to the computing device;
include the booster ID in the reference signal; and
receive the booster ID in the link establishment message.

12. A computer-implemented method, comprising:
receiving directional antenna orientation information describing directional transmission and reception pattern, wherein the directional transmission and reception pattern defines a time offset T, according to which an orientation of directional transmission antenna array at any arbitrary time x may be an approximately same orientation of directional reception antenna array at a subsequent time x+T;
implementing the directional transmission and reception pattern by controlling the orientations of a directional transmission antenna array and a directional reception antenna array;
sending a directionally-transmitted booster reference signal based on the implemented directional transmission and reception pattern; and receiving a link establishment message in response to the directionally-transmitted booster reference signal based on the implemented directional transmission and reception pattern.

13. The computer-implemented method of claim 12, comprising sending the directionally-transmitted booster reference signal over a millimeter wave (mmWave) frequency channel.

14. The computer-implemented method of claim 12, the link establishment message comprising a random access preamble or a beacon response.

15. The computer-implemented method of claim 12, comprising:
   generating the reference signal, when the directional transmission antenna array is approximately oriented towards a particular coverage sector within a coverage area;
   determining a coverage sector identifier (ID) for the coverage sector; and
   including the coverage sector ID in the reference signal.

16. The computer-implemented method of claim 12, comprising:
   determining a booster identifier (ID) corresponding to a eNB;
   including the booster ID in the reference signal; and
   receiving the booster ID in the link establishment message.

* * * * *